US012635614B2

(12) United States Patent
　　Comaschi

(10) Patent No.:　US 12,635,614 B2
(45) Date of Patent:　May 26, 2026

(54) HYDROPONIC SYSTEM AND DEVICES FOR IRRIGATING A GROWING CROP

(71) Applicant: Gyroplant Limited, East Sussex (GB)

(72) Inventor: Marcus Comaschi, Petersfield (GB)

(73) Assignee: Gyroplant Limited (GB)

( * ) Notice: Subject to any disclaimer, the term of this patent is extended or adjusted under 35 U.S.C. 154(b) by 47 days.

(21) Appl. No.: 18/279,586

(22) PCT Filed: Apr. 11, 2022

(86) PCT No.: PCT/GB2022/050899
　　§ 371 (c)(1),
　　(2) Date: Aug. 30, 2023

(87) PCT Pub. No.: WO2022/223948
　　PCT Pub. Date: Oct. 27, 2022

(65) Prior Publication Data
　　US 2024/0147923 A1　May 9, 2024

(30) Foreign Application Priority Data

Apr. 20, 2021　(GB) ...................................... 2105615

(51) Int. Cl.
　　*A01G 9/029*　　　(2018.01)
　　*A01G 31/02*　　　(2006.01)
(52) U.S. Cl.
　　CPC ........... *A01G 9/0293* (2018.02); *A01G 9/029* (2018.02); *A01G 31/02* (2013.01)
(58) Field of Classification Search
　　CPC .... A01G 31/06; A01G 31/065; A01G 31/025; A01G 31/023; A01G 9/026; A01G 9/029; A01G 9/0293; A01G 9/0302
　　See application file for complete search history.

(56) References Cited

U.S. PATENT DOCUMENTS

| | | | |
|---|---|---|---|
| 4,250,663 | A | 2/1981 | Merritt |
| 5,862,628 | A | 1/1999 | Takashima |

(Continued)

FOREIGN PATENT DOCUMENTS

| | | | |
|---|---|---|---|
| CA | 2460465 A1 | 9/2004 |
| CA | 2867551 A1 | 4/2016 |

(Continued)

OTHER PUBLICATIONS

Kratky, B.A., "A Suspended Pot, Non-Circulating Hydroponic Method," Proceedings of the South Pacific Soilles Culture Conference, Acta. Hort. 648. p. 83-89, 8 pages.

(Continued)

*Primary Examiner* — Magdalena Topolski
*Assistant Examiner* — Edgar Reyes
(74) *Attorney, Agent, or Firm* — Barnes & Thornburg

(57) ABSTRACT

Systems, methods, and devices for irrigating a growing crop by hydroponic means, in particular a hydroponic system and a reusable growing plug. In a first aspect there is provided a hydroponic system comprising a growing frame with a rotating portion. The rotating portion further comprises a spiral conduit. The spiral conduit comprises a plurality of apertures for receiving the growing crop. The spiral conduit is configured for receiving fluid and further comprises an opening for receiving the fluid into the spiral, such that in use rotation of the spiral conduit feeds the fluid around the conduit towards the centre of the spiral and past the plurality of apertures for receiving the growing crop. In a second aspect there is provided a reusable growing plug, for use in hydroponic systems, wherein at least a portion of the growing plug is flexible and comprises a first surface, a second surface and at least one aperture extending through the first and second surface for receiving a growing crop. The growing plug further comprises a plurality of prongs, (Continued)

coupled to the second surface. The growing plug has a first configuration and a second configuration, wherein in the first configuration the plurality of prongs are brought together relative to the second configuration; and in the second configuration the plurality of prongs are separated relative to the first configuration.

19 Claims, 13 Drawing Sheets

(56) References Cited

U.S. PATENT DOCUMENTS

| | | | |
|---|---|---|---|
| 8,402,692 B1 | 3/2013 | Park | |
| 8,919,040 B2 | 12/2014 | Galvan | |
| 9,288,951 B2 | 3/2016 | Hansen et al. | |
| 10,477,786 B1 | 11/2019 | Wilson | |
| 12,253,249 B2 | 3/2025 | Milton | |
| 2003/0094289 A1 | 5/2003 | Groot et al. | |
| 2003/0233787 A1 | 12/2003 | Hartman | |
| 2012/0137581 A1 | 6/2012 | Teasdale | |
| 2016/0192594 A1 | 7/2016 | Mawendra | |
| 2017/0094896 A1* | 4/2017 | Van Der Knaap | A01G 24/44 |
| 2017/0105373 A1 | 4/2017 | Byron, III et al. | |
| 2018/0213734 A1 | 8/2018 | Smith et al. | |
| 2018/0295800 A1 | 10/2018 | Kiernan | |
| 2018/0317408 A1 | 11/2018 | Castaldini | |
| 2018/0317410 A1 | 11/2018 | Sprio | |
| 2019/0269083 A1* | 9/2019 | Klein | A01G 31/06 |
| 2020/0008366 A1* | 1/2020 | Klein | A01G 31/06 |
| 2020/0008378 A1 | 1/2020 | Van Buuren et al. | |
| 2020/0367454 A1 | 11/2020 | Partlow | |
| 2021/0029902 A1 | 2/2021 | Milton et al. | |
| 2021/0033271 A1 | 2/2021 | Milton et al. | |
| 2021/0100178 A1 | 4/2021 | Schmutzer | |
| 2021/0378191 A1* | 12/2021 | Sisante | A01G 31/06 |
| 2021/0392834 A1 | 12/2021 | Rouxel | |
| 2023/0125260 A1 | 4/2023 | Enos et al. | |
| 2023/0148481 A1 | 5/2023 | Milton et al. | |
| 2025/0189114 A1 | 6/2025 | Milton | |

FOREIGN PATENT DOCUMENTS

| | | |
|---|---|---|
| CH | 692077 A5 | 1/2002 |
| CN | 204217616 U | 3/2015 |
| CN | 204291946 U | 4/2015 |
| CN | 106535619 A | 3/2017 |
| EP | 3243376 A1 | 11/2017 |
| EP | 2615906 B1 | 2/2018 |
| JP | 09037664 A | 2/1997 |
| JP | 09275830 A | 10/1997 |
| JP | 2018121527 A | 8/2018 |
| KR | 1020130042184 A | 4/2013 |
| KR | 1020180042951 A | 4/2018 |
| WO | 0183690 A2 | 11/2001 |
| WO | 2001080625 A1 | 11/2001 |
| WO | 2013021073 A1 | 2/2013 |
| WO | 2015150596 A1 | 10/2015 |
| WO | 2018101818 A1 | 6/2018 |

OTHER PUBLICATIONS

International Search Report for Application PCT/GB2022/050899, dated Jun. 28, 2022, 6 pages.
Search Report for Application GB2105615.5, dated Jan. 5, 2022, 2 pages.
Chinese First Office Action for Application No. 202280029199.3, dated Jul. 25, 2025, 11 pages.
Search Report for Application No. GB2200352.9, dated Mar. 8, 2022, 1 page.

* cited by examiner

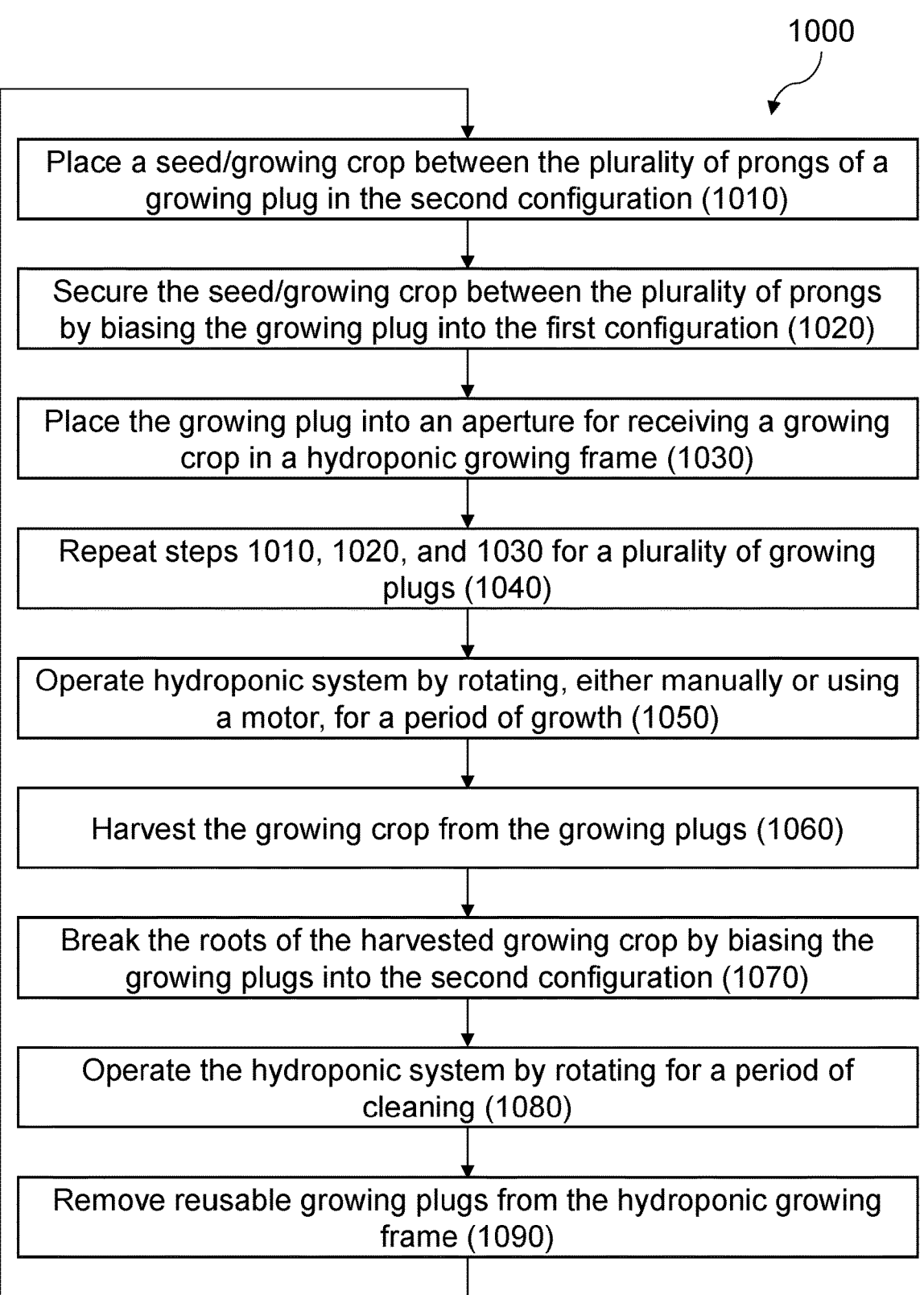

Place a seed/growing crop between the plurality of prongs of a growing plug in the second configuration (1010)

Secure the seed/growing crop between the plurality of prongs by biasing the growing plug into the first configuration (1020)

Place the growing plug into an aperture for receiving a growing crop in a hydroponic growing frame (1030)

Repeat steps 1010, 1020, and 1030 for a plurality of growing plugs (1040)

Operate hydroponic system by rotating, either manually or using a motor, for a period of growth (1050)

Harvest the growing crop from the growing plugs (1060)

Break the roots of the harvested growing crop by biasing the growing plugs into the second configuration (1070)

Operate the hydroponic system by rotating for a period of cleaning (1080)

Remove reusable growing plugs from the hydroponic growing frame (1090)

Figure 10

HYDROPONIC SYSTEM AND DEVICES FOR IRRIGATING A GROWING CROP

This application is a U.S. national stage entry of PCT Application No. PCT/GB2022/050899, filed Apr. 11, 2022, which claims priority to, and the benefit of, GB2105615.5, filed Apr. 20, 2021, the disclosures of which are expressly incorporated herein by reference in their entireties.

FIELD OF INVENTION

The present application relates to systems, methods and devices for irrigating a growing crop by hydroponic means, in particular a hydroponic system and a reusable growing plug.

BACKGROUND

In a hydroponic system, plants are commonly grown in water-based, nutrient-rich solutions, removing the need for expansive farming land and nutrient-rich soil. Hydroponic agriculture is a fast-expanding industry due to its potential to address world food shortages, climate change and societal changes moving away from traditional soil and land-based agriculture techniques.

Many hydroponic systems rely on modular, vertically stacked hydroponic arrangements to improve space utilisation and increase the amount of produce grown per unit area. However, vertically stacked hydroponic systems can be labour intensive and challenging to inspect and harvest growing crops. Furthermore, hydroponic systems can be expensive due to complex water pumping systems.

Some rotational hydroponic systems have been developed, such as Rotofarm by Bace Inc, and Omega Garden™. These hydroponic systems rely on a rotating cylindrical drum configuration to produce a net-zero gravity environment for the growing crop. This interferes with the growing crop's sense of gravitropism and is believed to result in faster growth rates.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In a first aspect there is provided a hydroponic system for irrigating a crop wherein the system comprises a growing frame, and wherein the growing frame comprises a rotating portion further comprising a spiral conduit. The spiral conduit comprises a plurality of apertures for receiving the growing crop. The spiral conduit is configured for receiving fluid, for example nutrient-rich fluid, and further comprises an opening for receiving the nutrient-rich fluid into the spiral, such that in use rotation of the spiral conduit feeds the nutrient-rich fluid around the conduit towards the centre of the spiral and past the plurality of apertures for receiving the growing crop. In some examples, the use of the spiral conduit to feed fluid past the plurality of apertures for receiving the growing crop may remove the need for fluid pumping means in the hydroponic system. This may be advantageous as fluid pumping means can be expensive and energy intensive. In some examples, the spiral conduit shape and plurality of apertures for receiving the growing crop may result in an increased capacity to receive growing crops relative to a cylindrical drum configuration of the same diameter and depth.

In some examples, the plurality of apertures for receiving the growing crop are arranged on a face of the conduit facing towards the centre of the spiral, such that the growing crop grow concentrically inwards towards the centre of the spiral. This configuration may enable the growing crop to experience a net-zero gravity environment during rotation which may increase the growth rate of the growing crop. This configuration may also reduce the volume of nutrient-rich fluid lost through the plurality of apertures during use relative to an alternative configuration wherein the plurality of apertures for receiving the growing crop are arranged on a face of the conduit facing away from the centre of the spiral, due to gravity. Other configurations may also be possible, for example wherein the plurality of apertures for receiving the growing crop are arranged on a face of the conduit facing outwards, perpendicular to the centre of the spiral.

In some examples, the plurality of apertures for receiving the growing crop are evenly spaced around the spiral. In some examples, the spacing between the apertures may be based on the growing crop, for example the growing crop species, for example the growing space required by the growing crop species.

In some examples, the growing frame further comprises a static portion to support the rotating portion.

In some examples, the spiral conduit is supported by the static portion of the growing frame above a fluid bath. In use, the opening for receiving the nutrient-rich fluid into the spiral may be configured to scoop up fluid from the fluid bath as the spiral is rotated. In some examples, the use of the spiral conduit to collect fluid from the fluid bath during a rotation may remove the need for fluid pumping means in the hydroponic system. This may be advantageous as fluid pumping means can be expensive and energy intensive.

In some examples, the opening for receiving the nutrient-rich fluid comprises a scoop. The scoop may increase the volume of the nutrient-rich fluid received into the spiral conduit. The scoop may extend beyond the circumference of the spiral conduit, this may allow the scoop to collect nutrient-rich fluid from deeper within the fluid bath.

In some examples, the centre of the spiral is coupled to a flow path for feeding fluid back to the fluid bath. By recycling the fluid back into the fluid bath, this may reduce water usage and water waste produced by the hydroponic system. Reducing water usage may result in a more sustainable and less resource-intensive hydroponic system.

In some examples, the fluid bath may comprise a valve system coupled to a fluid supply wherein the valve is configured to detect when the fluid level is low and replenish the fluid in the fluid bath.

In some examples, the fluid bath may be drip fed nutrients from a central reserve. The flow rate of nutrients into the fluid bath may be manually controlled or automatically regulated. This may allow the fluid, for example water, in the fluid bath to maintain a desired nutrient level. The desired nutrient level may be determined by the optimum level for the growing crop or a determination by the farmer, for example dependent on affordability.

In some examples, the spiral is an Archimedean spiral.

In some examples, the growing frame may comprise a plurality of conduits arranged in a plurality of spirals. The plurality of spiral conduits may be arranged to spiral in the same direction, for example in a clockwise direction, or in an anti-clockwise direction, such that in use fluid may be fed through the plurality of spiral conduits. For example, the growing frame may comprise two spiral conduits. This may improve the space utilisation of the hydroponic system and increase the amount of produce grown per growing frame.

In some examples, the growing frame comprises a pair of conduits arranged as a pair of spirals, wherein the first spiral is offset by 180 degrees from the second spiral in the rotation axis such that the opening for receiving the nutrient-rich fluid is on the opposite side of the first spiral to the opening for receiving the nutrient-rich fluid of the second spiral.

In some examples, the rotating portion of the growing frame may be rotationally actuated manually. For example, the rotating portion may be intermittently rotated in segments of a full rotation cycle. This may be advantageous by reducing the energy consumption of the hydroponic system. In some examples, the rotating portion may further comprise a handle for manual actuation. In some examples, the growing frame may further comprise at least one marker to indicate rotation positions, this may help the user to homogenise rotation cycles. In some examples, the hydroponic system may be entirely manually actuated, this may be advantageous for use in resource-constrained environments, including developing nations.

In other examples, the rotating portion of the growing frame may be rotationally actuated by a motor. This may be advantageous by reducing the required labour compared to manual actuation. In some examples, the rotating portion may be intermittently rotated in segments of a full rotation cycle; in other examples, the rotating portion may be continuously rotated. In some examples, the hydroponic system may further comprise renewable power generation means, for example solar panels, to power the hydroponic system, including the motor.

Varying the speed of rotation may result in varying amounts of water/nutrients reaching the growing crop, and varying amounts of aeration.

In some automated examples, there may be a plurality of operational modes. For example, different operational modes may require a controller to implement different rotation speeds using the motor. Different rotation speeds may be used, for example, for different growing crops, for example based on growing crop species, depending on the desired rate of water/nutrient delivery and/or aeration. Different rotation speeds may also be used for harvesting, such that in use the speed of rotation is tuned to the picking speed during harvest. This may allow the user or robotic picker to harvest the growing crop at substantially the same height. A cleaning operational mode may also utilise different rotation speeds, such that fluid can be fed through the conduit to flush out residual dirt and debris. Custom speeds determined by the user/farm may also be implemented, and/or stored in a memory coupled to the controller.

In some examples, the hydroponic system may further include means for blowing air, for example hot air, through the spiral conduit. In use, air may be blown through the spiral conduit to clear dried roots and debris from the conduit during a cleaning operational mode.

In some examples, the hydroponic system may include artificial lighting, for example LED lighting. This may be advantageous for use in locations where natural lighting is insufficient for optimum growth of the growing crop, including indoor locations. Artificial lighting may also be used to accelerate growth of a growing crop by providing extended light hours compared to natural light. In some examples, the artificial lighting may be controlled according to a predetermined schedule. In some examples, the artificial lighting may be controlled in response to signals from a light sensor when natural light levels are detected above and/or below a predetermined threshold. In some examples, the artificial lighting can be controlled via a central controller, in some examples the central controller may control both the artificial lighting and the motor. In some examples, the artificial lighting may be tuned for selected light wavelengths, configured to optimise the health and growth rate of the growing crop, for example, but not limited to, boosting blue wavelengths, including 430 to 450 nm, and/or red wavelengths, including 640 to 680 nm. In some examples, LED lighting may also emit infrared wavelengths of light, for example wavelengths within a range of 700 nm to 1 mm, for example wavelengths within a range of 700 nm to 1,400 nm, for example wavelengths within a range of 700 nm to 760 nm.

In some examples, a strip light source may be held in a fixed position adjacent to the spiral conduit, wherein the length of the strip light source is based on the diameter of the spiral. This configuration may be advantageous as it uses a single fixed light source adjacent to the rotating spiral conduit, thereby reducing the amount of lighting, and thus energy consumption, required to provide light energy to the whole of the spiral conduit. In other examples, a pair of strip lights may be used on opposite sides of the growing frame.

In some examples, a strip light source may be arranged on at least a portion of a face of the conduit facing away from the centre of the spiral. In this configuration, the strip light may be arranged to be directly opposite the growing crop located on the adjacent outer turn of the spiral conduit. This configuration may be advantageous by providing a more equal distribution of lighting to the growing crop throughout the spiral conduit. In some examples, an additional light source may be arranged at the centre of the spiral configured to provide light for the growing crop in the plurality of apertures 108 on the innermost turn of the spiral conduit 106A.

In some examples, the hydroponic system comprises a set of tracks, wherein the set of tracks supports a plurality of growing frames. This may be advantageous to improve space utilisation by using multiple growing frames. The plurality of growing frames may be movable on the set of tracks to adjust their separation. The ability to adjust the separation may be advantageous as it allows the growing frames to be compact during growing to improve space utilisation, however also allows the growing frames to be easily moved and separated to facilitate inspection, maintenance, and harvesting of growing crops.

In some examples, the hydroponic system further comprises a plurality of reusable growing plugs, detailed in the second aspect of the invention, wherein each the plurality of reusable growing plugs are configured to fit within the plurality of apertures for receiving the growing crop on the at least one spiral conduit.

In a second aspect there is provided a reusable growing plug, for use in hydroponic systems. A reusable growing plug may be advantageous by providing a sustainable solution and reducing waste compared to single use growing plugs, and/or biodegradable growing plugs. The reusable growing plug of the present invention, wherein at least a portion of the growing plug is flexible, comprises a first surface, a second surface and at least one aperture extending through the first and second surface for receiving a growing crop. The growing plug further comprises a plurality of prongs, coupled to the second surface. The growing plug has a first configuration and a second configuration, wherein in the first configuration the plurality of prongs are brought together relative to the second configuration; and in the second configuration the plurality of prongs are separated relative to the first configuration.

In some examples, the growing crop may be a seed. In some examples, the growing crop may be seed embedded in biodegradable tissue. In some examples, the growing crop may include other forms of plant, for example germinated seedlings.

In some examples, the first configuration may enable the growing crop to be grasped and held by the prongs. As a result, in some examples no growing media is required. This may reduce the amount of material required for growing, thus reducing waste, increasing sustainability, and reducing the cost.

Furthermore, the first configuration may also allow fluid passing the growing plug to be retained through surface tension on the prongs, delivering fluid and nutrients to the growing crop. This may be particularly advantageous before the growing crop has established roots.

In some examples, the growing crop may be propagated and harvested in one growing plug, using no other processes.

In some examples, the second configuration may enable the growing plug to separate and/or break the roots of the growing crop. In some examples, this may facilitate easy removal of the roots and cleaning of the reusable growing plug after harvest of the growing crop.

In some examples, in the second configuration, the plurality of prongs may be configured to form a radial arrangement, such that the prongs are separated relative to the first configuration. In some examples, the prongs may be configured to extend radially around the aperture. In some examples, the radial arrangement of prongs in the second configuration may be arranged such that the plurality of prongs are configured to lie in the same plane as the aperture, for example such that the growing plug may be configured to lie flat in the second configuration.

In some examples, in the first configuration the growing plug is biased to form a dome, and wherein in the second configuration the growing plug is biased to form an inverse dome, opposite to the first configuration. In some examples, the first and second surfaces form a diaphragm, wherein in the first configuration the diaphragm is biased to form a dome, and wherein in the second configuration the diaphragm is biased to form an inverse dome, opposite to the first configuration.

In some examples, in the first configuration the growing plug is biased to form a tapered shape, for example such as a frustum of a cone; and wherein in the second configuration the growing plug is biased to form an inverse tapered shape, opposite to the tapered shape of the first configuration, for example the frustum of a cone shape. In some examples, the first and second surfaces form a diaphragm, wherein in the first configuration the diaphragm is biased to form a tapered shape, for example a frustum of a cone, and wherein in the second configuration the diaphragm is biased to form an inverse a tapered shape, opposite to the first configuration.

The skilled person will understand that in other examples, the first and second surfaces may form a diaphragm, wherein the diaphragm is configured to be biased to form any other suitable shapes. Preferably, the shape of the diaphragm in the second configuration is inverted relative to the shape of the diaphragm in the first configuration.

In some examples, transitioning the growing plug between the first configuration and the second configuration may comprise inverting the diaphragm in the second configuration relative to the first configuration. For example, such that, in the first configuration, the first surface may be outwards facing, and the second surface may be inwards facing; and, in the second configuration, the first surface may be inwards facing, and the second surface may be outwards facing; or vice versa.

The aperture in the growing plug, extending through the first and second surfaces, may be configured to allow the growing crop to grow through the aperture. In some examples, the aperture is cross-shaped, for example a cross slit. This may allow the aperture slit to widen as the growing crop grows. In other examples, the aperture may be circular, or any other suitable shape.

In some examples, the plurality of prongs coupled to the second surface comprises at least four flexible prongs. In some examples, the plurality of prongs coupled to the second surface may comprise twenty-eight flexible prongs; however the skilled person will understand any other number of prongs may be used. In some examples, the prongs 904 may be equally spaced along the second surface, optionally wherein the prongs are arranged concentrically or circumferentially around the aperture.

In some examples, each prong may comprise a proximal end and a distal end, wherein the proximal end is coupled to the second surface and the distal end extends away from the second surface. In some examples, each prong may have a substantially tapered shape, for example wherein the cross-sectional area of each prong is greater at the proximal end than at the distal end.

In some examples, at least a portion of the growing plug is made of rubber.

In some examples, the growing plug further comprises a grip on the first surface. This may be used for facilitating transitioning between the first and second configurations, for example when the growing plug is within an aperture in a hydroponic system. In some examples, the grip on the first surface may comprise at least one prong.

In some examples, the growing plug further comprises a resilient portion. The resilient portion may be sized to fit within an aperture for receiving a growing crop in a hydroponic system. In some examples, the resilient portion may be configured to engage with the edges of an aperture for receiving a growing crop in a hydroponic system. In some examples, the resilient portion may be configured to fit within an aperture for receiving a growing crop in a hydroponic system by a friction fit. In use, the growing plug may be additionally secured within the aperture in a hydroponic system by root growth of the growing crop within the conduit.

In some examples, the resilient portion may comprise a flange. In some examples, the diaphragm may comprise a flange. In some examples, the flange may be configured to engage with the edges of an aperture for receiving a growing crop in a hydroponic system. In some examples, the flange may be used to secure and/or seal the growing plug within an aperture for receiving a growing crop in a hydroponic system.

BRIEF DESCRIPTION OF DRAWINGS

Embodiments of the disclosure will now be described, by way of example only, with reference to the accompanying drawings, in which:

FIGS. 7A and 7B show example light source configurations for example hydroponic systems, such as the example hydroponic system of FIGS. 1 to 6B.

FIG. 10 shows an example method for using reusable growing plugs, such as the example reusable growing plug of FIGS. 9A and 9B or FIGS. 11A to 11D, within a hydroponic system, such as the example hydroponic systems of FIGS. 1 to 8C.

DETAILED DESCRIPTION

Figure 1:
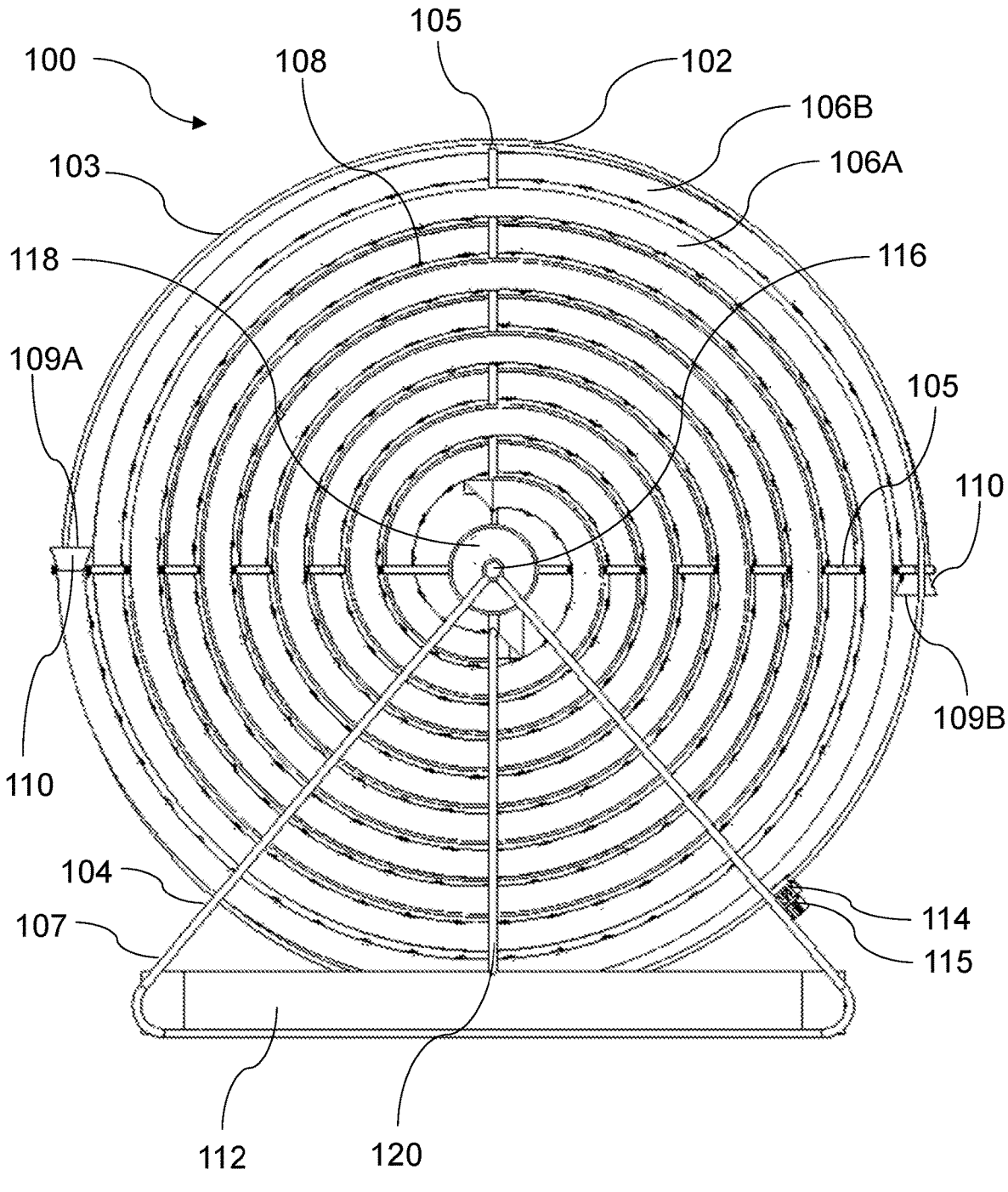
FIG. 1 shows an example hydroponic system.

FIG. 1 shows an example hydroponic system comprising a growing frame 100 further comprising a rotating portion 102 and a static portion 104. In this example, the rotating portion 102 comprises a circular frame 103 with two struts 105, attached to the circumference of the circular frame 103 and spanning the diameter of the frame 103, such that the struts 105 bisect the circular frame 103 into four equal quadrants. In this example the circular frame 103 is made of steel, in other examples other materials may be used, including other metals or plastic. The circular frame 103 further comprises an axle 116 which is disposed at the centre of the circular frame 103, attached at the bisection point of the struts 105. The axel 116 is perpendicular to plane of the circular frame 103.

In this example, the static portion 104 comprises a pair of identical triangular frames 107, coupled together by at least one horizontal strut 111. In this example the static portion 104 is made of steel, in other examples other materials may be used, including other metals or plastic. The triangular frames 107 are orientated to have a flat edge at the base of the frame and an apex vertically displaced from the centre of the base edge. The length of the base of the triangular frames 107 is approximately comparable to the diameter of the rotating portion 102, however the length of the base is preferably slightly less than the diameter of the rotating portion 102. The maximum height of the triangular frames 107 at the apex must be greater than the radius of the rotating portion 102, in this example, the maximum height of the triangular frames 107 at the apex is slightly greater than the radius of the rotating portion 102. The circular frame 103 is located between the pair of triangular frames 107, parallel to the plane of the triangular frames 107. In the example shown, the axle 116 is positioned perpendicular to the pair triangular frames 107, between the apexes of the triangular frames 107 of the static portion 104. The outer ends of the axle 116 are received within an aperture at the apex of each of the pair of triangular frames 107. The axel 116 may be provided in a bearing at each apex of the pair of triangular frames 107.

The hydroponic system shown in FIG. 1 further comprises a fluid bath 112. The fluid bath 112 is positioned between the triangular frames 107 at the base of the growing frame 100, underneath the rotating portion 102. In some examples, the fluid bath 112 is supported by a plurality of the perpendicular struts between the triangular frames of the static portion 104. In this example, the length of the fluid bath 112 is comparable to the length of the base of the triangular frames 107. In this example, the width of the fluid bath 112 is equal to the separation of the triangular frames 107. The depth of the fluid bath 112 is determined by the height difference between the height of the axle 116, determined by the height of the triangular frames 107 at the apex, relative to the radius of the rotating portion 102.

The rotating portion 102 further comprises a pair of conduits 106A and 106B, both arranged in spiral configurations. In other examples, the rotation portion 102 may comprise a singular conduit, or more than two conduits. In this example, the conduits 106A and 106B are identical. In this example, the conduits 106A and 106B are Archimedean spirals. The pair of spiral conduits 106A and 106B are arranged on opposite faces of the circular frame 103. The conduits 106A and 106B are attached to the circular frame 103 along at least one of the struts 105 spanning the diameter of circular frame 103. An example attachment arrangement is shown in more detail in FIGS. 4A and 4B.

The spiral conduits 106A and 106B comprise a plurality of apertures 108 arranged on a face of the conduit facing towards the centre of the spiral. In some examples, the spiral conduits 106A and 106B may be made of HDPE or polypropylene. In other examples, other materials, such as other plastics or metals, can be used. In some examples, the spiral conduits 106A and 106B may be corrugated. In the example shown, the conduits 106A and 106B have an internal cross-sectional diameter of 100 mm. In other examples, other sizes of conduit may be used, for example wherein the size of conduit is configured to allow growing crops with a particular root length, or wherein the size of conduit is configured to perform a particular function of allowing fluid to travel through, including determining the volume of fluid delivery to the growing crop. In this example, the spiral conduits 106A and 106B have a spiral diameter of 3 metres. In other examples, different diameters of spiral configurations may be used. For example, the spiral configuration may have a diameter preferably within, but not limited to, a range of 1 to 10 metres. In some examples, 5 metres may be the maximum diameter of the spiral configuration by which the growing crop may still be harvested by hand from ground level.

In this example, the outer end of each spiral conduit 106A and 106B comprises an opening 109A and 109B, respectively. The openings 109A and 109B are disposed on the end face of each of the conduits 106A and 106B, parallel to the conduit cross-section. In this example, the openings 109A and 109B span the diameter of the conduits 106A and 106B, such that the conduits 106A and 106B are open-ended at the outermost end of the spiral. A scoop 110 is optionally attached to the spiral conduits 106A and 106B at the openings 109A and 109B. In the example shown, the scoop 110 has a conical shape.

In this example, the inner end of the spiral conduits 106 at the centre of the spiral are coupled to a flow path 120 for feeding fluid back to the fluid bath 112. An example flow path is shown in more detail in FIGS. 6A and 6B.

In the example shown in FIG. 1, a motor 114 is optionally mounted onto a horizontal strut 111 between the pair of triangular frames 107 of the static portion 104 of the growing frame 100. The motor 114 is mounted in the middle of the strut 111, aligned with the circular frame 103 of the rotating portion 102. In the example shown, the motor 114 is attached to the strut 111 by a two-portion motor housing 115. A first portion of the motor housing 115 is secured onto the strut 111, as the strut 111 passes through an aperture in the first portion of the motor housing 115. The first portion of the motor housing 115 further comprises a receiving groove. At least a portion of the motor 114 fits within the receiving groove within the first portion of the motor housing 115. The second portion of the motor housing 115 is a bracket, wherein the bracket is attached to the first portion of the motor housing 115, opposite the receiving groove and adjacent to the motor 114. The second portion of the motor housing 115 may be attached to the first portion of the motor housing 115 by bolts, or other securing means, such as screws. The second portion of the motor housing 115 is configured to secure the motor 114 within the receiving portion of the first portion of the motor housing 115.

The motor 114 is arranged to contact the circumference of the circular frame 103 of the rotating portion 102. In the example shown, the motor 114 comprises a pair of identical wheels arranged on opposite sides of and contacting the circumference of the circular frame 103.

The rotating portion 102 of the growing frame 100 is configured to rotate, such that the spiral conduits 106A and 106B also rotate.

The static portion 104 is arranged to support the rotating portion 102 above a fluid bath 112, such that the outer end of the conduit 106 comprising the opening 109 is configured to be at least partially submerged in the fluid within the fluid bath 112 during rotation. The static portion 104 is configured to support the rotating portion 102, about an axle 116, such that the rotating portion 102, including the spiral conduit 106, can rotate freely. The motor 114 is configured to drive the rotating portion 102 to rotate in a clockwise or anti-clockwise direction. In other examples, the rotating portion 102 may be rotated manually. In the example shown, the pair of wheels of the motor 114 are configured to rotate in opposite directions relative to each other whilst contacting the circular frame 103 to drive rotation of the rotating portion 102. The motor 114 may be configured to operate at a plurality different rotation speeds. The plurality of different rotation speeds may be attributed to different operational modes. Different operational modes may be used, for example, for different growing crops, for example based on growing crop species, depending on the desired rate of water/nutrient delivery and/or aeration. Different operational modes may also be used for harvesting, such that in use the speed of rotation is tuned to the picking speed during harvest. This may allow the user or robotic picker to harvest the growing crop at substantially the same height. A cleaning operational mode may also utilise a different rotation speed, such that fluid can be fed through the conduit to flush out residual dirt and debris. Custom rotation speeds determined by the user/farm may also be implemented, and/or stored in a memory coupled to a motor controller.

Figure 2:
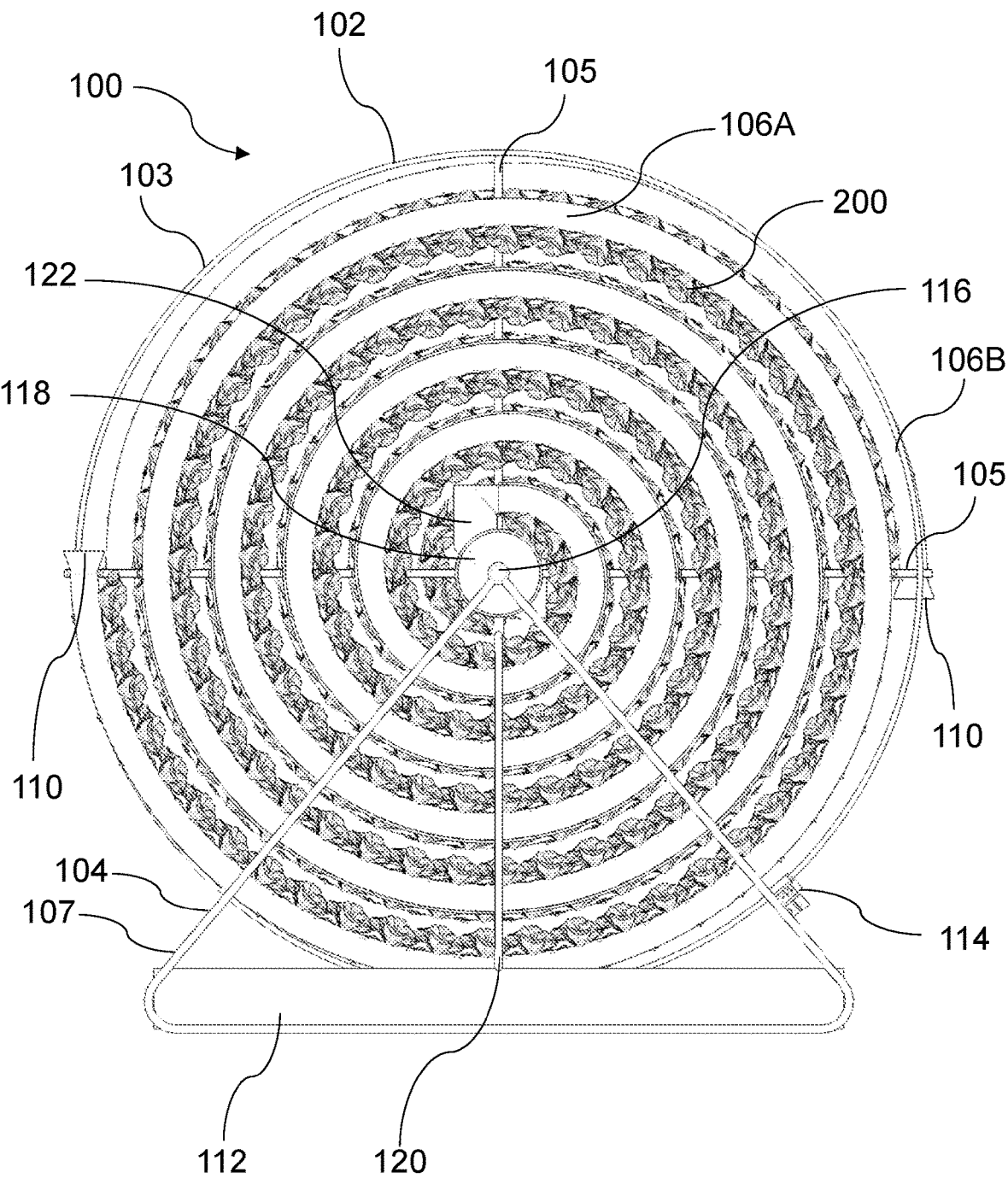
FIG. 2 shows the example hydroponic system of FIG. 1 including a growing crop, as in use.

The plurality of apertures 108 are each configured to receive a growing crop 200, as shown in FIG. 2. In the example shown, the plurality of apertures 108 are each configured to receive a reusable growing plug 900, wherein the reusable growing plug 900 is configured to receive a growing crop 200. The growing plug 900 is configured to grasp the growing crop 200 to ensure the growing crop 200 is secured and does not fall out of the spiral conduits 106A and 106B during rotation. An example reusable growing plug 900 is shown in more detail in FIGS. 9A and 9B. The skilled person will understand that the plurality of apertures 108 may additionally, or instead, be configured to receive a reusable growing plug 1100, or any other suitable reusable growing plug, wherein the reusable growing plug 1100 is configured to receive a growing crop 200. The growing plug 1100 may also be configured to grasp the growing crop 200 to ensure the growing crop 200 is secured and does not fall out of the spiral conduits 106A and 106B during rotation. An example reusable growing plug 1100 is shown in more detail in FIGS. 11A to 11D.

As shown in FIG. 2, the growing crop 200 stem systems grow concentrically inwards, towards the centre of the spiral. This may be driven by phototropism. The growing crop 200 root systems grow concentrically outwards, into the spiral conduit 106A.

In the example shown in FIG. 2, the spacing between the apertures 108 is configured to maximise the number of apertures 108 along the conduits 106A and 106B, thereby maximising space utilisation for growing crops 200, whilst also providing a suitable amount of space between the apertures 108 required for growth of the growing crop species. In some examples, the spacing between the apertures 108 may be determined by the optimum growing space required by the growing crop species.

Similarly, the distance between turns of the spiral conduits 106A and 106B may be determined by the optimum growing space required by the growing crop species. For example, growing crops with a tall shoot system may require a greater distance between the turns of the spiral conduits 106A and 106B compared to growing crops with a shorter shoot system.

The spiral conduits 106A and 106B are configured to receive fluid through the openings 109A and 109B and deliver it to the growing plugs 900 within the plurality of apertures 108.

The scoop 110 is configured to increase the volume of the fluid received into the spiral conduits 106. For example, the scoop 110 may be configured to extend beyond the circumference of the spiral conduits 106A and 106B, to enable the scoop 110 to collect fluid from deeper within the fluid bath 112 than the openings 109 in the spiral conduits 106A and 106B alone. An example scoop 110 is shown in more detail in FIG. 5. In this example, the scoop 110 is configured to fit into the openings 109A and 109B by a friction fit. In other examples, other methods of attachment may be used, for example a screw thread.

In use, the motor 114 rotates the pair of motor wheels in opposite directions. The contact between the pair of rotating wheels of the motor 114 with the circular frame 103 exerts a rotational force onto the circular frame 102. This feeds the circumference of the circular frame 103 through the pair of wheels, driving the rotation actuation of the rotating portion 102.

In use, rotation of the rotating portion 102 causes the scoops 110 in the openings 109A and 109B at the end of the spiral conduits 106A and 106B to scoop up fluid from the fluid bath 112 and feed the fluid around the conduits 106A and 106B towards the centre of the spiral and past the plurality of apertures 108 for receiving the growing crop.

In examples wherein growing plugs 900 are disposed within the plurality of apertures 108, some of the passing fluid may be retained on the growing plug 900 through surface tension. During rotation, the retained fluid may travel along the growing plug 900 to the growing crop 200. This may be especially beneficial before the growing crop 200 has developed an established root system. An example growing plug 900 is described in more detail in FIGS. 9A and 9B. The skilled person will also understand that in examples wherein growing plugs 1100 are disposed within the plurality of apertures 108, some of the passing fluid may be retained on the growing plug 1100 through surface tension. During rotation, the retained fluid may travel along the growing plug 1100 to the growing crop 200. This may be especially beneficial before the growing crop 200 has developed an established root system. An example reusable growing plug 1100 is shown in more detail in FIGS. 11A to 11D.

Figure 3:
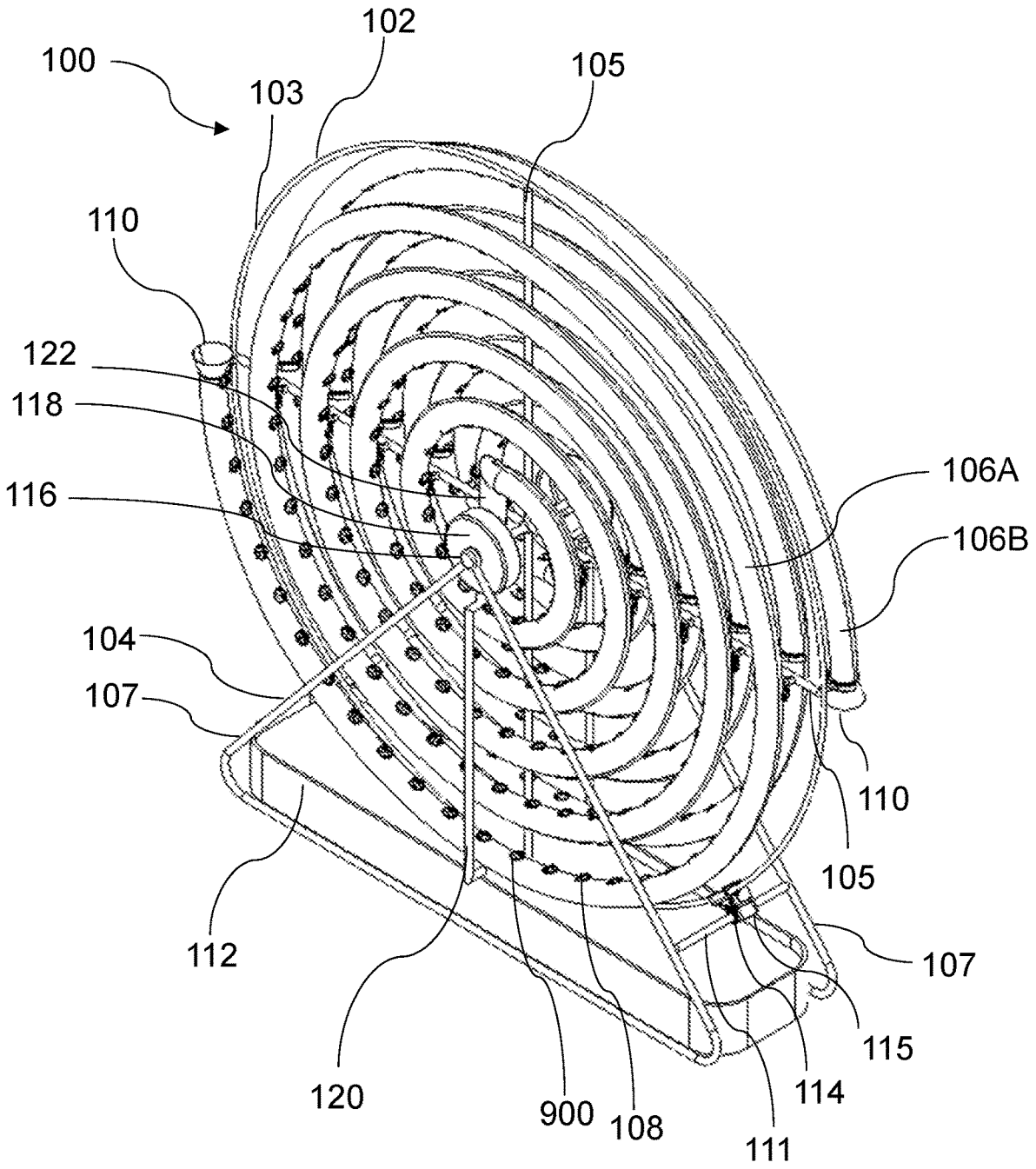
FIG. 3 shows the example hydroponic system of FIG. 1 from an isometric view.

In use, where the diameter of the spiral configuration exceeds 5 metres in diameter, a ladder, cherry-picker or robotic automation may be required for harvesting the growing crop 200. FIG. 3 shows the example hydroponic system of FIG. 1 from a different perspective. In this example, the first spiral 106A is offset by 180 degrees from the second spiral 106B in the rotation axis such that the opening 109A for receiving the fluid is on the opposite side of the first spiral 106A to the opening 109B for receiving the fluid of the second spiral 106B. In use, the first spiral collects fluid from the fluid bath 112 during a rotation, followed by the second spiral with collects fluid from the fluid bath 112 half a rotation cycle later. This may help to stabilise the growing frame 100. Aside from the staggering of the spiral conduits 106A and 106B, the growing frame 100 is otherwise symmetrical about the central circular frame 103 of the rotating portion 102, for example both conduits 106A and 106B have separate but identical flow paths 120 at the inner end of the spiral to return the residual fluid to the water bath 112. An example flow path 120 is shown in more detail in FIGS. 6A and 6B.

Figures 4A, 4B:
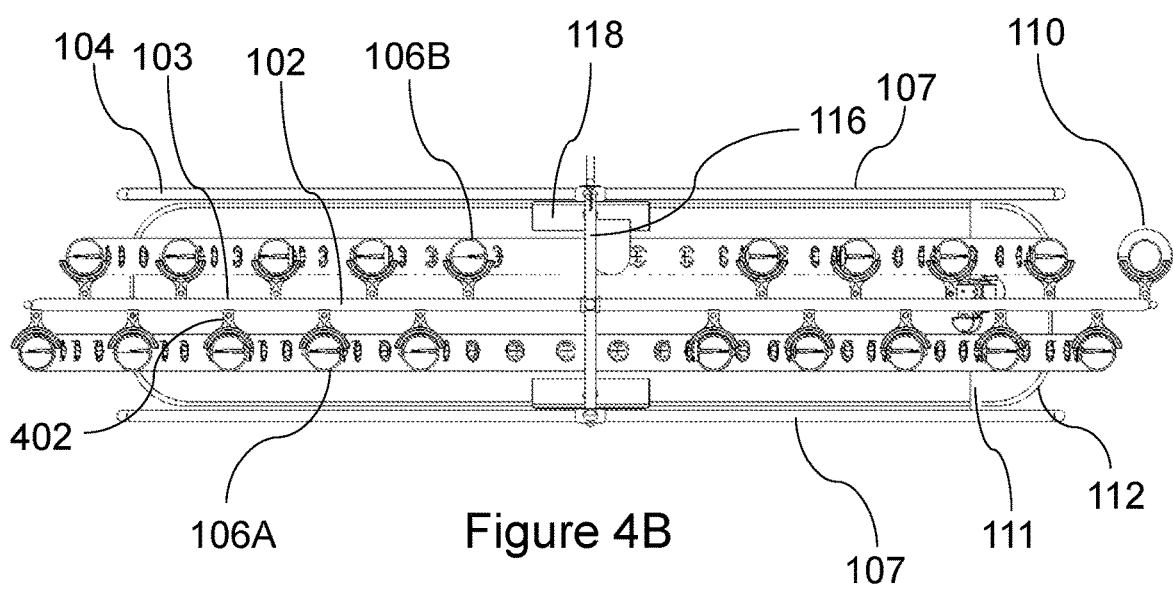
FIGS. 4A and 4B show cross sectional views of an example hydroponic system such as the example hydroponic system of FIG. 1.

In the example shown in FIGS. 4A and 4B, the pair of spiral conduits 106A and 106B are connected to the rotating portion 102 of the growing frame via brackets 402. Due to the first spiral conduit 106A being offset by 180 degrees from the second spiral conduit 106B, the brackets 402 have a staggered configuration. In this example, the conduits 106A and 106B are configured to clip into the Y-shaped brackets 402 using a friction fit. In other examples, the conduits may be attached to the brackets using additional fixtures, such as bolts, or screws.

Figure 5:
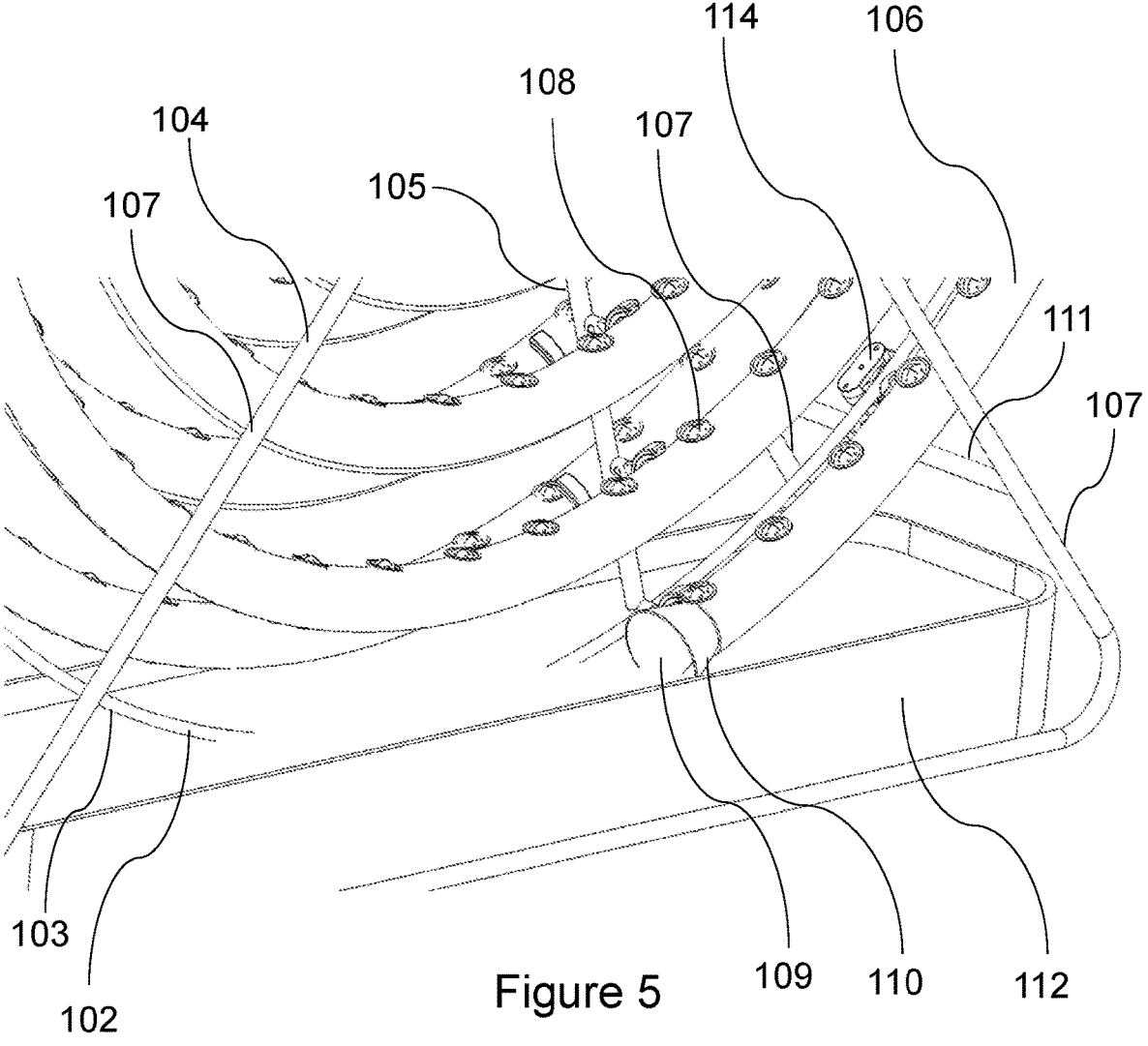
FIG. 5 shows a detailed view of a scoop of an example hydroponic system, such as the example hydroponic system of FIGS. 1 to 4, entering a fluid bath.

In the example shown in FIG. 5, the rotating portion 102, including the at least one spiral conduit 106, is arranged above a fluid bath 112, such that the outer end of the conduit 106 comprising the opening 109 is configured to be at least partially submerged in the fluid within the fluid bath 112 during rotation. In use, the opening 109 for receiving nutrient-rich fluid into the spiral conduit 106 is configured to scoop up fluid from the fluid bath 112 as the spiral conduit 106A is rotated. In this example, the opening 109 for receiving nutrient-rich fluid comprises a scoop 110. The scoop 110 may increase the volume of nutrient-rich fluid received into the spiral conduit 106. The scoop 110 may extend beyond the circumference of the spiral conduit 106 which may allow the scoop to collect nutrient-rich fluid from deeper within the fluid bath 112.

In some examples, the fluid within the fluid bath 112 may be automatically replenished from a central fluid supply. In some examples, the fluid bath 112 may comprise a valve system coupled to a fluid supply wherein the valve is configured to detect when the fluid level is low and replenish the fluid in the fluid bath. In other examples, the fluid within the fluid bath 112 may be manually replenished.

In some examples, the fluid bath 112 may be drip fed nutrients from a central reserve to enrich the fluid. The nutrient-rich fluid may be configured to increase the health and growth rate of the growing crop. The flow rate of nutrients into the fluid bath may be manually controlled or automatically regulated. This may allow the fluid in the fluid bath 112 to maintain a desired nutrient level. In other examples, the nutrients may be manually replenished by supplementing the fluid within the fluid bath 112.

Figure 6A:
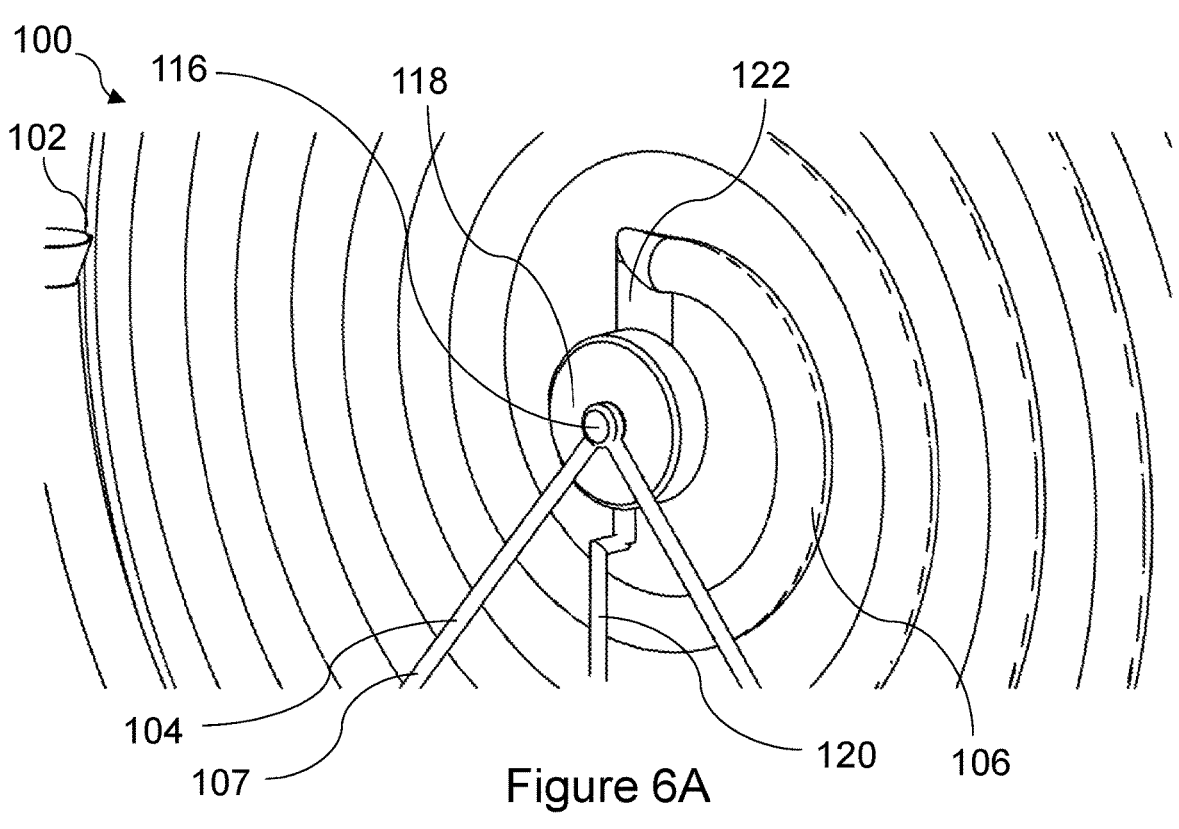
FIGS. 6A and 6B show a detailed view of an example flow path of an example hydroponic system, such as the example hydroponic system of FIGS. 1 to 5, for feeding fluid back to a fluid bath.
Figure 6B:
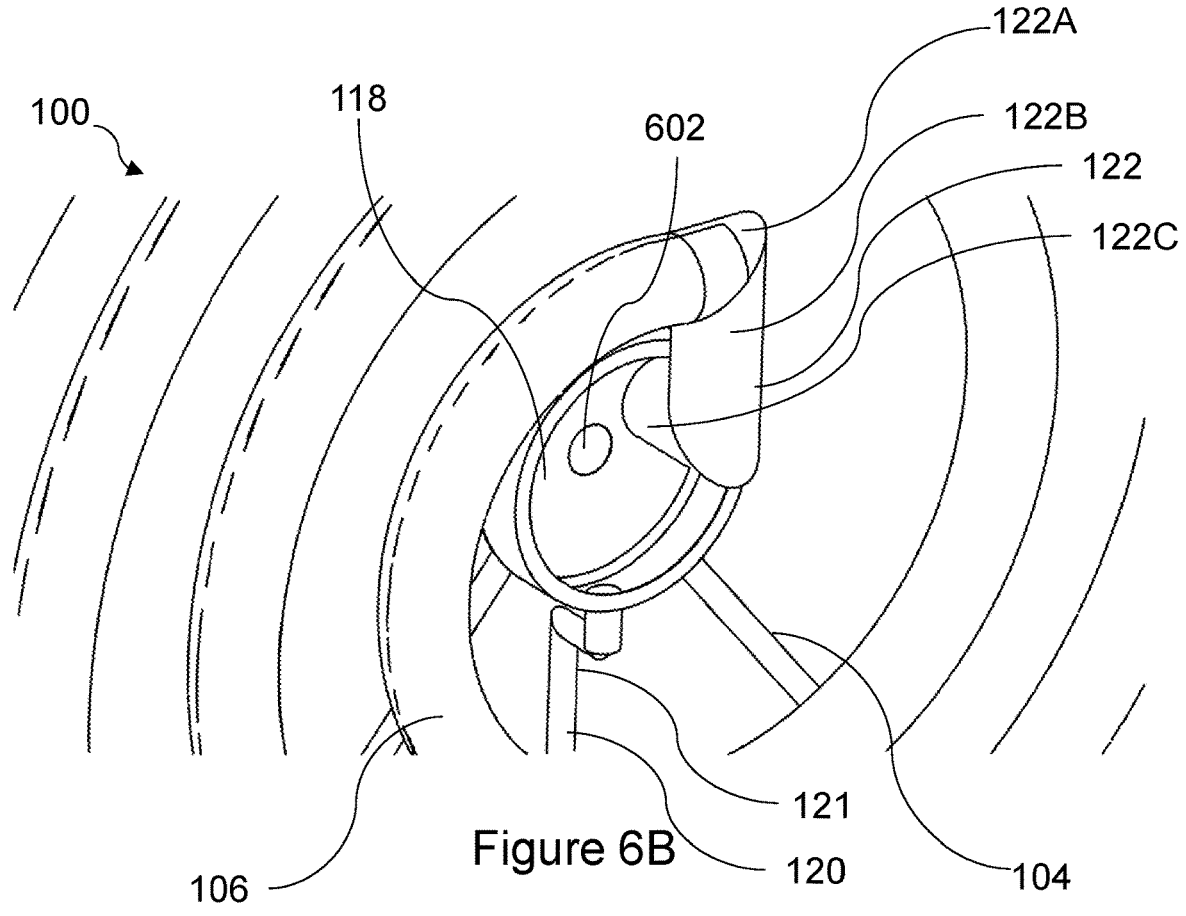

FIGS. 6A and 6B show an example flow path 120 for feeding fluid back to the fluid bath 112 from the inner end of the spiral conduit 106. The flow path arrangement comprises a connecting conduit 122 which couples the inner end of the spiral conduit 106 to a receptacle 118. In the example shown, the connecting conduit 122 comprises three sections, 122A, 122B, and 122C, arranged perpendicular relative to each other. A first end of the connecting conduit 122 is attached to the inner end of the spiral conduit 106, and the second end of the connecting conduit 122 is coupled to a receiving portion of the receptacle 118. The connecting conduit may be attached to the inner end of the spiral conduit 106 using a friction fit.

The receptacle 118 is attached to the apex of the triangular frame 107 of the static portion 104 of the growing frame 100.—In the example shown, the receptacle 118 has a cylindrical shape, wherein the receiving portion of the receptacle 118 is arranged facing the spiral conduit 106, parallel to the rotating portion 102 of the growing frame 100. The receptacle 118 has an aperture 602 on the opposite face to the receiving portion of the receptacle 118. A down pipe 121 is connected at the base of receptacle 118. The down pipe 121 couples the receptacle 118 to the fluid bath 112.

The first section 122A of the connecting conduit 122 is configured to attach to the inner end of the spiral conduit 106. The first section 122A is configured to receive residual fluid from the inner end of the spiral conduit 106. The second section 122B is configured to couple the first section 122A and third section 122C of the connecting conduit 122, and is configured to receive the residual fluid from the first section 122A of the connecting conduit 122 and transfer the fluid to the third section 122C of the connecting conduit 122. The third section 122C is configured to be coupled to the receiving portion of the receptacle 118. The third section 122C is configured to receive fluid from the second section 122B and transfer the fluid to the receptacle 118.

The receiving portion of the receptacle 118 is configured to receive fluid from the third section 122C of the connecting conduit 122. The receptacle 118 is configured to transfer the fluid to the down pipe 121. The central aperture 602 in the receptacle 118 is configured to receive the axle 116 of the rotating portion 102.

The down pipe 121 is configured to receive the fluid from the receptacle 118 and is further configured to transfer the fluid to the fluid bath 112. This completes the flow path 120 to feed fluid back to the fluid bath 112.

By recycling the fluid back into the fluid bath 112, this may reduce water usage and water waste produced by the hydroponic system. Reducing water usage may result in a more sustainable and less resource-intensive hydroponic system.

Figures 7A, 7B:
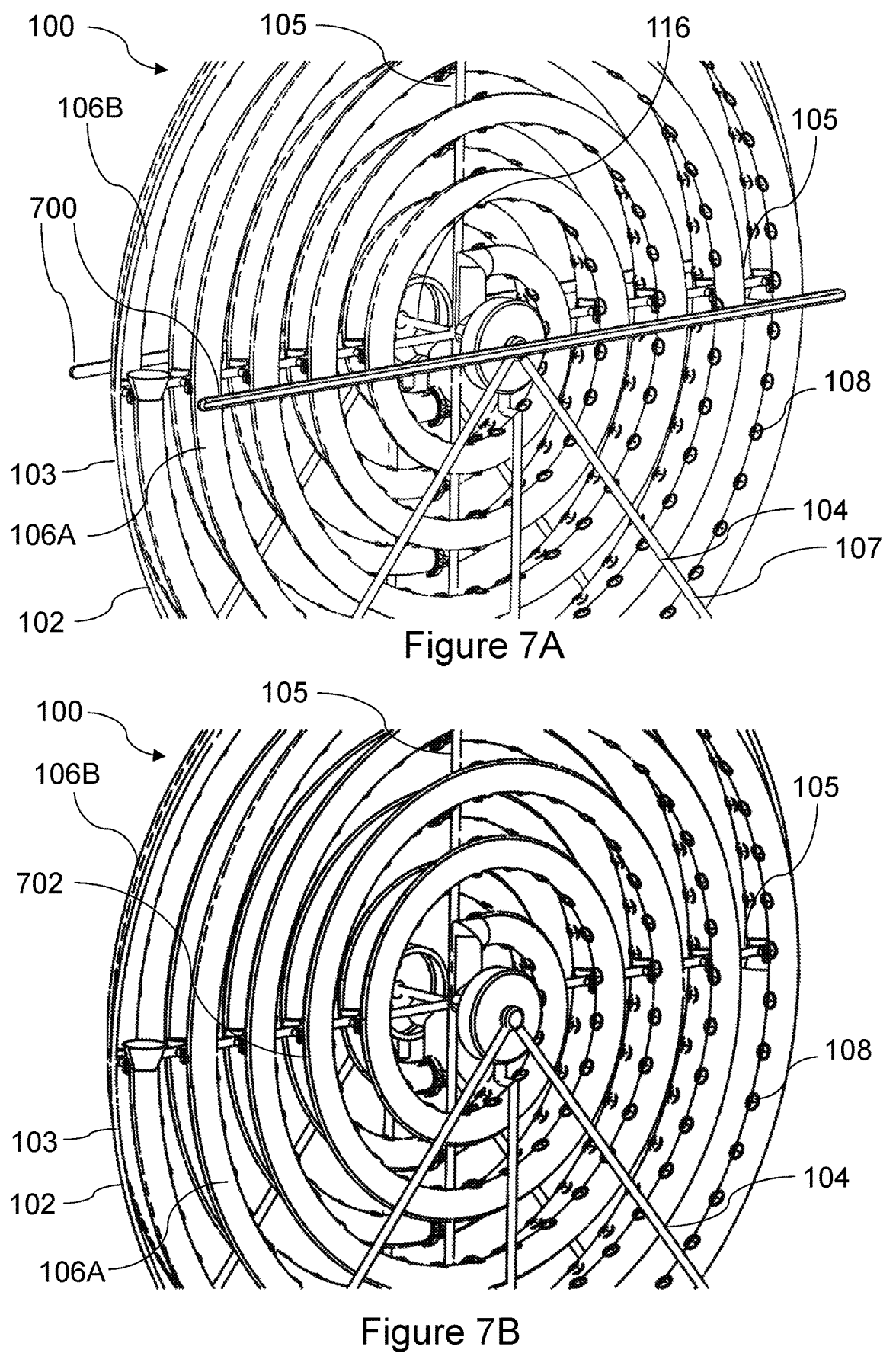

In use as the spiral conduit 106 rotates, residual fluid is fed to the inner end of the spiral conduit 106 and into the connecting conduit 122. During rotation, the connecting conduit 122 follows a circular path, wherein the third section 122C of the connecting conduit 122 circles around the interior area of the receptacle 118. The residual fluid passes through the connecting conduit 122 into the receptacle 118. The fluid then drains from the receptacle 118 through the downpipe 121 into the fluid bath 112. FIG. 7A shows an example lighting configuration comprising a pair of strip light sources 700 held adjacent to the pair of spiral conduits 106A and 106B, wherein the length of the strip light source 700 is based on the diameter of the spiral conduits 106A and 106B. The length of the strip light source 700 is significantly greater relative to its width and depth dimensions. The light source 700 is directed towards the spiral conduits 106A and 106B. Each strip light 700 within the pair are arranged on opposite sides of the growing frame 100. The strip light sources 700 are fixed to the static portion 104 of the growing frame 100. In this example, the strip light sources 700 are attached at the apex of the triangular frames 107, aligned with the height of the axle 116. The strip light sources 700 extend horizontally and the length of the strip light source is equal to the diameter of the spiral conduits 106A and 106B. In other examples, the strip light sources 700 may have alternative orientations but preferably maintains alignment with the axle 116. In this example, the strip light sources 700 are LED light sources. In other examples, other types of light sources may be used. In this example, the LED lighting emits wavelengths spanning the visible light spectrum. The LED lighting may be further tuned for selected light wavelengths, configured to optimise the health and growth rate of the growing crop, for example boosting blue wavelengths, including 430 to 450 nm, and/or red wavelengths, including 640 to 680 nm. In some examples, the LED lighting may also emit infrared wavelengths. In other examples, a single strip light source may be used.

FIG. 7B shows an alternative example lighting configuration comprising a flexible strip light source 702, arranged on at least a portion of a face of the spiral conduit 106A facing away from the centre of the spiral. In this configuration, the strip light 702 is arranged to be directly opposite the plurality of apertures 108 located on the adjacent outer turn of the spiral conduit 106A relative to the strip light position. The strip light 702 is configured begin on the face of the second turn of spiral conduit 106A facing away from the centre of the spiral, opposite the outermost aperture 108 located on the outermost turn of the spiral conduit 106A. The strip light 702 is configured end at the end of the face of the innermost turn of spiral conduit 106A facing away from the centre of the spiral. In use, the plurality of apertures 108 are configured to receive a growing crop such that the light source 702 is arranged directly above the growing crop. In some examples, an additional light source may be arranged at the centre of the spiral configured to provide light for the growing crop in the plurality of apertures 108 on the innermost turn of the spiral conduit 106A. In this example, the strip light sources 702 are LED light sources. In other examples, other types of light sources may be used. In this example, the LED lighting emits wavelengths spanning the visible light spectrum. The LED lighting may be further tuned for selected light wavelengths, configured to optimise the health and growth rate of the growing crop, for example boosting blue wavelengths, including 430 to 450 nm, and/or red wavelengths, including 640 to 680 nm. In some examples, the LED lighting may also emit infrared wavelengths.

Figure 8A:
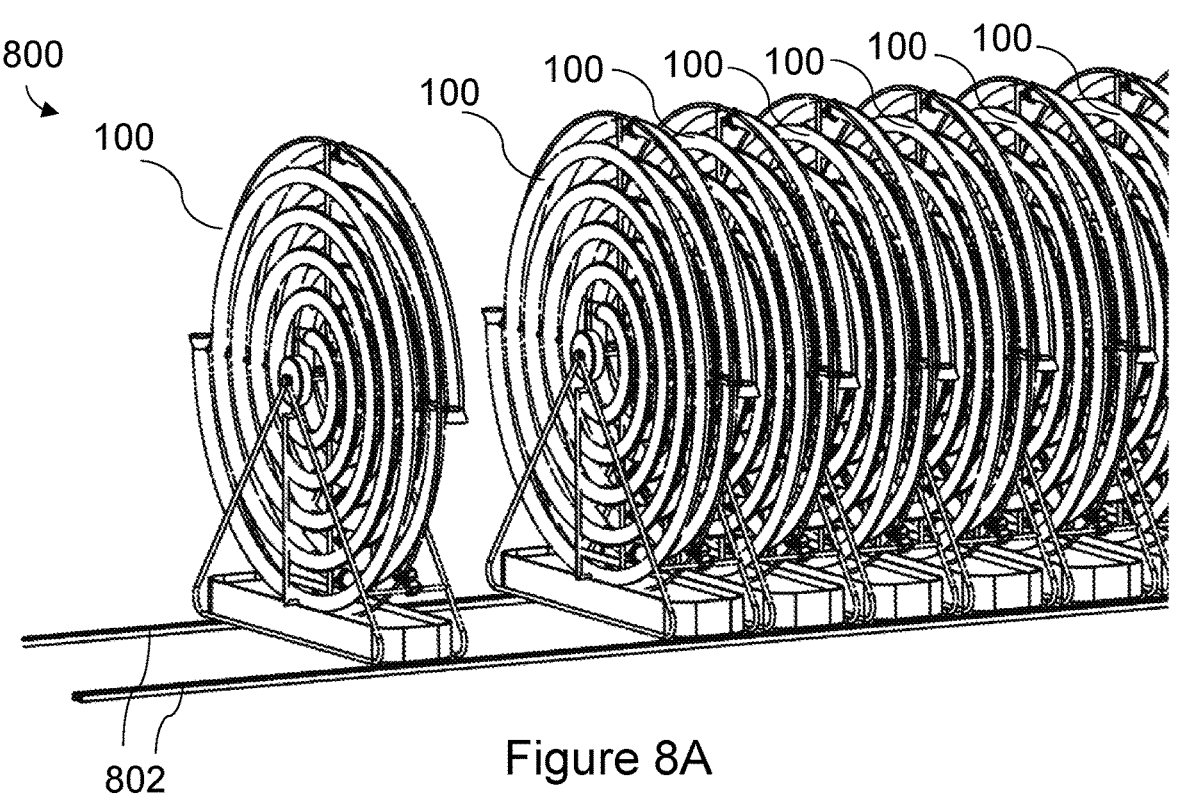
FIGS. 8A to B show an example hydroponic system comprising a plurality of growing frames, such as the example growing frames of FIGS. 1 to 7B.
Figure 8B:
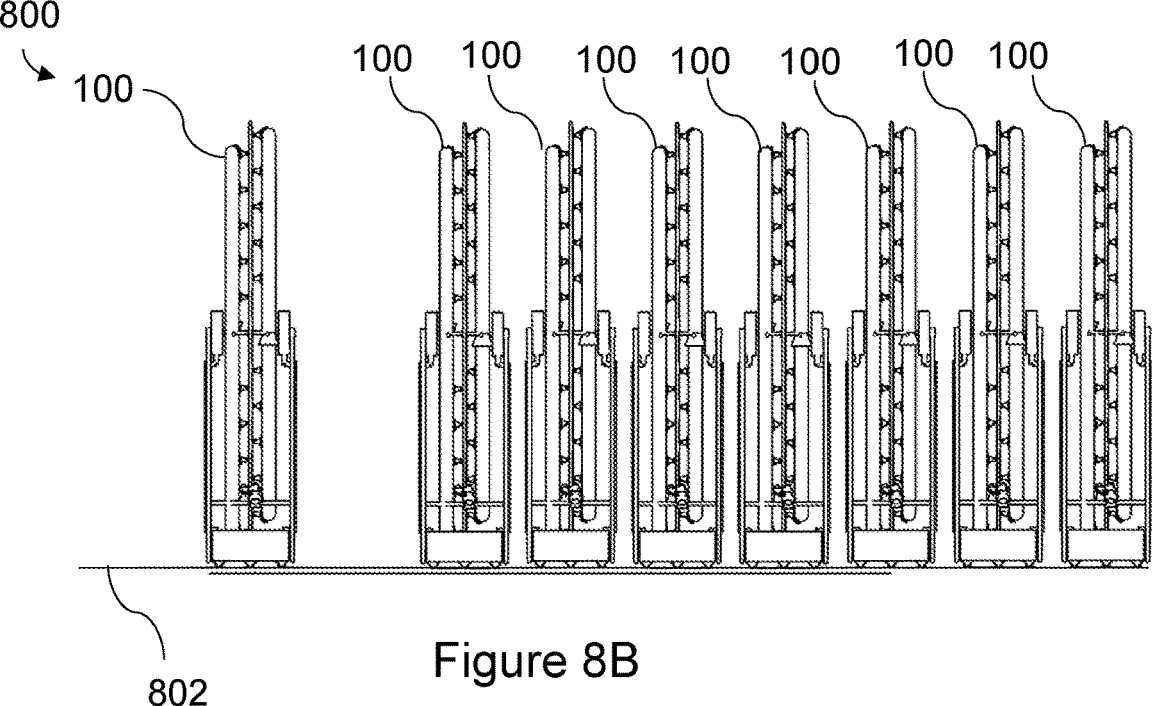

In the example shown in FIGS. 8A and 8B, the hydroponic system 800 comprises a set of tracks 802, wherein the set of tracks 802 supports a plurality of growing frames 100. The plurality of growing frames 100 preferably have the same dimensions, however in some examples the plurality of growing frames 100 may have different spiral conduits 106 configured for different growing crops. The tracks 802 are orientated perpendicular to the rotating portion 102 of the growing frames 100. The tracks 802 are configured to be spaced based on the width of the base of the triangular frames 107 of the static portion 104 of the growing frames 100, parallel to the rotating portion 102 of the growing frames 100. The length of the tracks 802 is determined by the depth of the plurality of growing frames 100.

The plurality of growing frames 100 may be movable on the set of tracks 802 to adjust their separation. Thus, the length of the tracks 802 may be configured to accommodate at least the combined depth of plurality of growing frames 100, including a portion of extra length to facilitate separating at least one growing frame 100 from the plurality of adjacent growing frames 100. The ability to adjust the separation may be advantageous as it allows the growing frames 100 to be compacted together during growing to improve space utilisation, however also allows the growing frames 100 to be easily moved and separated to facilitate inspection, maintenance, and harvesting of growing crops. For example, in use, the plurality of growing frames 100 may be separated during preparation of the hydroponic system, for example during placement of growing plugs 900 or 1100 into the apertures 108 for receiving a growing crop in a hydroponic growing frame 100 to facilitate easy access for the farmer. During the growth phase of the growing crop, the plurality of growing frames 100 may be moved close together, such that the rotating portions 102 of the plurality of growing frames 100 are adjacent to each other. This may improve the space utilisation during a period of growth. The plurality of growing frames 100 may then be separated again to facilitate easy access to each growing frame during harvest. In the example shown, the plurality of growing frames 100 may be sequentially separated, such that at one time one growing frame 100 is separated from the plurality of growing frames 100 adjacent to each other. This may allow the length of the tracks 802 to be shorter than would be required if all of the plurality of growing frames 100 were simultaneously separated, thus improving the space utilisation.

Figure 8C:
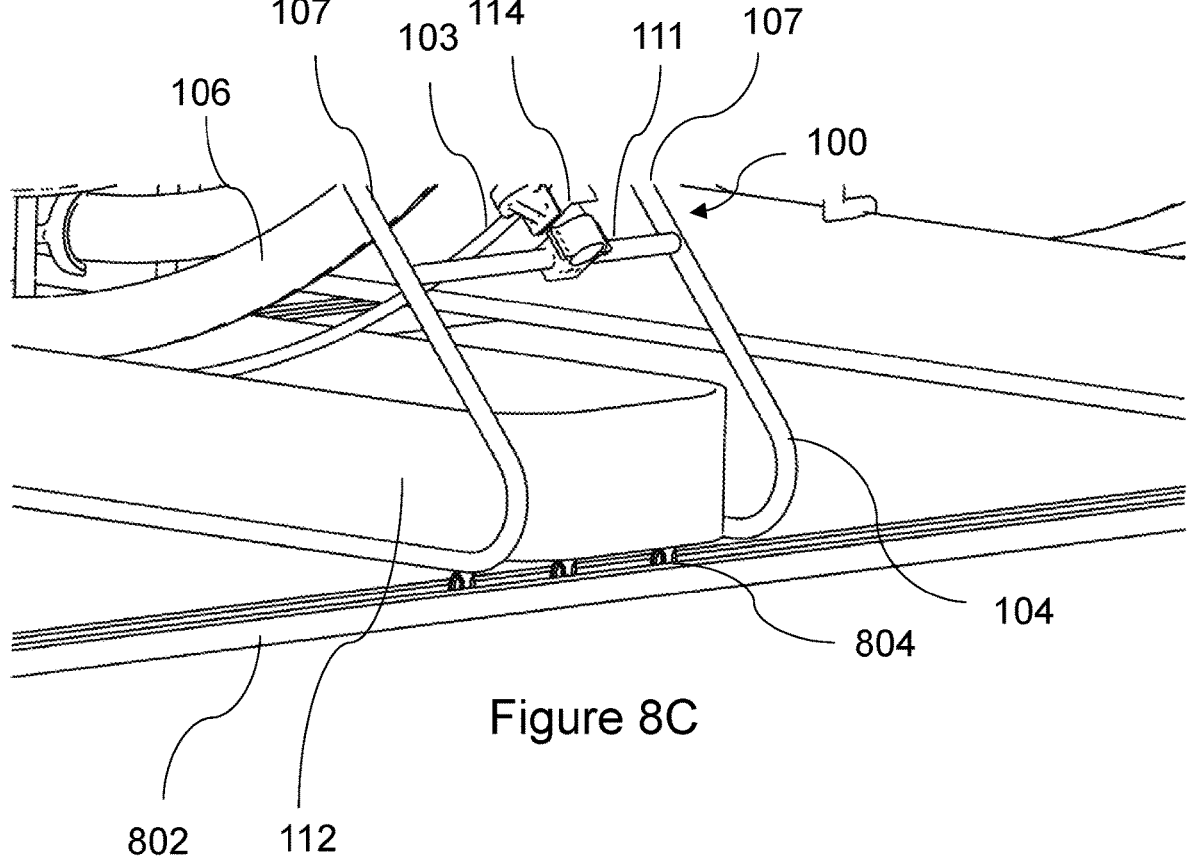
FIG. 8C shows a detailed view of an example set of tracks for use in a hydroponic system, such as the example hydroponic system of FIGS. 8A and 8B, comprising a plurality of growing frames.

FIG. 8C shows a detailed example wherein the plurality of growing frames 100 are movable on the set of tracks 802 by a set of wheels 804 coupled to the static portion 104 of the growing frame. In the example shown, the set of wheels comprises three wheels 804. The wheels 804 may be attached to the base of the pair of triangular frames 107 of the static portion 104 of the growing frame 100. The wheels 804 may also be attached to the perpendicular struts which support couple together the pair of triangular frames 107 of the static portion 104 of the growing frame 100.

Reusable Growing Plug

Figure 9A:
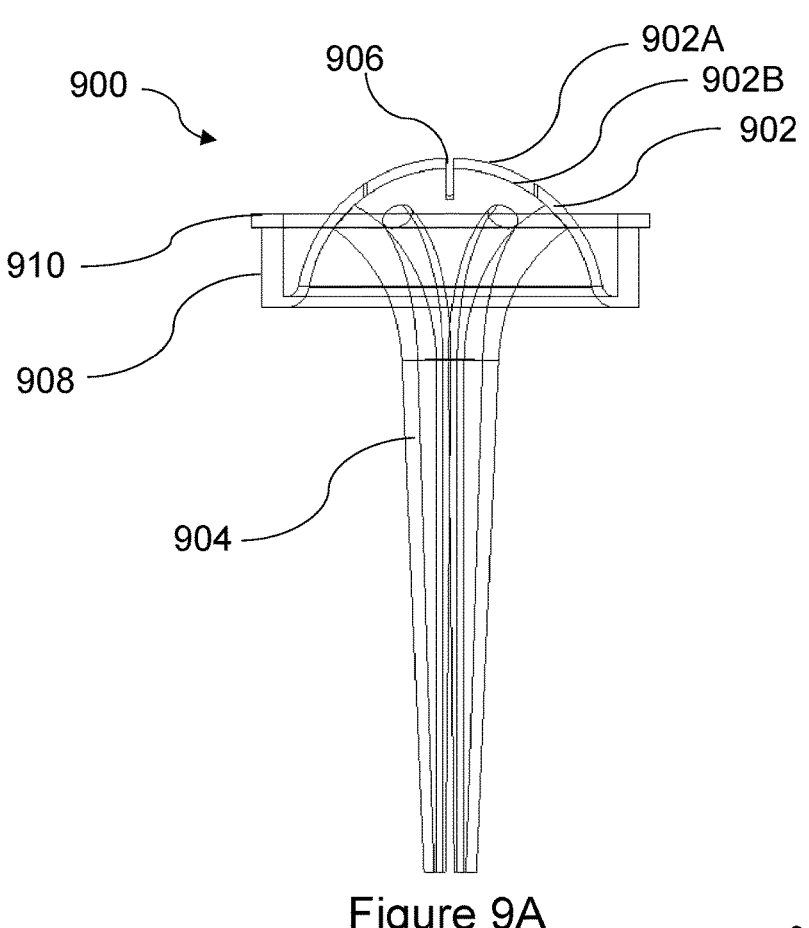
FIG. 9A shows an example reusable growing plug, in a first configuration.
Figure 9B:
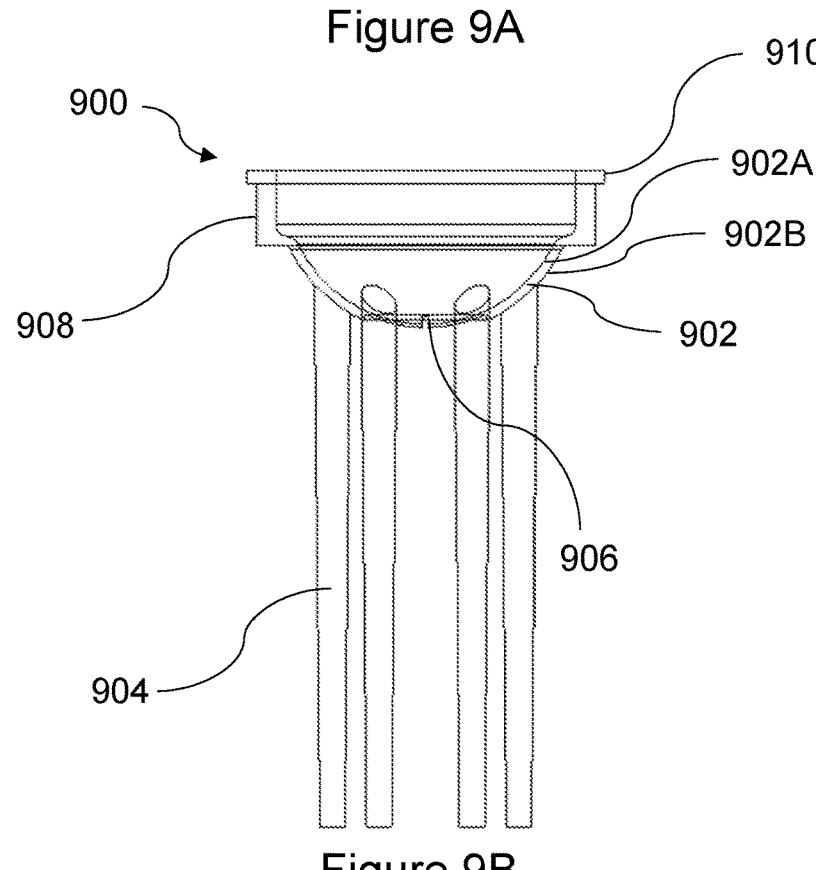
FIG. 9B shows the example reusable growing plug of FIG. 9A, in a second configuration.

FIGS. 9A and 9B show an example reusable growing plug 900. The growing plug 900 comprises a first surface 902A and a second surface 902B opposite to the first surface 902A, forming a flexible diaphragm 902.

The growing plug 900 further comprises an aperture 906 arranged centrally in the diaphragm 902, spanning through the first surface 902A and the second surface 902B. In the example shown, the aperture 906 is a cross slit. This may allow the aperture slit 906 to widen as the growing crop grows. In other examples, other slits or aperture shapes may be used.

A plurality of prongs 904 extend from the second surface 902B of the diaphragm 902. In the example shown, there are four prongs 904. In other examples, there may be more or fewer prongs 904. In this example, the prongs 904 are equally spaced around the aperture 906. In other examples, the prongs 904 may have different arrangements.

The growing plug 900 also comprises a resilient portion 908 which surrounds the diaphragm 902. In the example shown in FIGS. 9A and 9B, the resilient portion 908 has a circular cross-section. In other examples, the resilient portion 908 may have a different shaped cross-section, for example, but not limited to, a square, rectangular, or triangular cross-section. In this example, the diaphragm 902 is coupled to the lower edge of the resilient portion 908, aligned such that in the first configuration the diaphragm extends through the resilient portion 908, whereas in the second configuration the diaphragm extends outwardly from the resilient portion 908. However, in other examples the diaphragm 902 may be attached at any point within the internal circumference of the resilient portion 908. The resilient portion 908 optionally comprises a flange 910. In this example, the flange 910 is arranged at the upper edge of the resilient portion 908, opposite to the edge of the resilient portion 908 coupled to the diaphragm 902. However, in some examples, the flange 910 may be arranged at the lower edge of the resilient portion 908. In some examples, the resilient portion may have a flange 910 arranged at the outer edge of the resilient portion 908 and a second flange arranged at the lower edge of the resilient portion 908.

In some examples, the growing plug 900 is made of rubber.

FIG. 9A shows the example growing plug 900 arranged in a first configuration, wherein the diaphragm 902 is biased to form a dome and the plurality of prongs 904 are brought together relative to the second configuration.

FIG. 9B shows the example growing plug 900 arranged in a second configuration, wherein the diaphragm 902 is biased to form an inverse dome, opposite to the dome of the first configuration, and the plurality of prongs 904 are separated relative to the first configuration.

The cross-section of the resilient portion 908 may be configured to be received by an aperture for receiving a growing crop in a hydroponic system, such as the hydroponic system of any of FIGS. 1 to 8C. In some examples, the resilient portion 908 may be configured to engage with the circumference of the aperture for receiving a growing crop in a hydroponic system by a friction fit. In some examples, the flange 910 may be configured to secure and/or seal the growing plug 900 within a receiving aperture in a hydroponic system, for example by engaging with the edges of the aperture. For example, when a flange 910 is arranged at the upper edge of the resilient portion 908, the flange 910 may resist the growing plug falling through an aperture for receiving a growing crop and into the conduit in a hydroponic system. When a flange 910 is arranged at the lower edge of the resilient portion 908, the flange 910 may resist the growing plug falling out of an aperture for receiving a growing crop in a hydroponic system during rotation.

In use, the first configuration is configured to grasp a growing crop between the prongs 904. This may secure the growing crop in position within the growing plug 900.

As the growing crop grows, the root system extends along the prongs 904. When in situ within a hydroponic system, this allows the roots to extend into the nutrient and fluid supply, for example within a conduit.

Before the root system has developed, the growing crop may receive fluid from the prongs 904 which retain some of the passing fluid through surface tension. During rotation, the retained fluid may travel along the prongs 904 to the growing crop.

The shoot system of the growing crop grows in the opposite direction to the root system, and as it grows the stem protrudes through the aperture 906. This may be driven by the plant's sense of phototropism. During growth, the stem of the growing crop becomes thicker and the aperture slit 906 may be configured to flex to widen the aperture to accommodate the thickening of the stem. In a cross slit configuration, the leaflets of the aperture slit 906 are configured to be pushed outwards in the direction of stem growth to widen the aperture 906.

After a period of growth, the shoot system of the growing crop may be easily harvested as it protrudes through the aperture 906 and outwards from the first surface 902A of the growing plug 900.

In use, the second configuration is configured to separate and/or break the roots of a growing crop. This may facilitate easy removal of the growing crop roots from the growing plug 900 after the growing crop has been harvested. The reusable growing crop 900 may then be easily cleaned for reuse with another growing crop.

FIGS. 11A to 11D show another example reusable growing plug 1100. The growing plug 1100 comprises a first surface 902A and a second surface 902B opposite to the first surface 902A, forming a flexible diaphragm 902.

The growing plug 1100 further comprises an aperture 906 arranged centrally in the diaphragm 902, spanning through the first surface 902A and the second surface 902B. In the example shown, the aperture 906 is circular. In other examples, other slits or aperture shapes may be used.

A plurality of prongs 904 extend from the second surface 902B of the diaphragm 902. In the example shown, there are twenty-eight prongs 904. In other examples, there may be more or fewer prongs 904. In this example, the prongs 904 are equally spaced along the second surface 902B of the diaphragm 902, circumferentially around the aperture 906. In other examples, the prongs 904 may have different arrangements.

Each prong 904 comprises a proximal end 1102 and a distal end 1104, wherein the proximal end 1102 is coupled to the second surface 902B of the diaphragm 902 and the distal end 1104 extends away from the diaphragm 902. Each prong 904 may have a substantially tapered shape, for example wherein the cross-sectional area of each prong 904 is greater at the proximal end 1102 than at the distal end 1104. In this example, the proximal end 1102 of each prong 904 spans the height of the second surface 902B of the diaphragm 902.

The diaphragm 902 optionally comprises a flange 910. In this example, the flange 910 is arranged at the outer edge 11086 of the diaphragm 902, wherein the outer edge 1106 is defined as the edge of the diaphragm 902 furthest from the aperture 906. Optionally, the outer edge 1106 of the diaphragm 902 may have a larger circumference than the inner edge 1108. In other examples, the flange 910 may be arranged at any other circumferential position of the diaphragm 902. In some examples, the resilient portion may have a flange 910 arranged at the outer edge 1106 of the diaphragm 902 and a second flange arranged either at the inner edge 1108 of the diaphragm 902 or at any other circumferential position along the diaphragm 902.

In some examples, the growing plug 1100 is made of rubber.

Figure 11A:
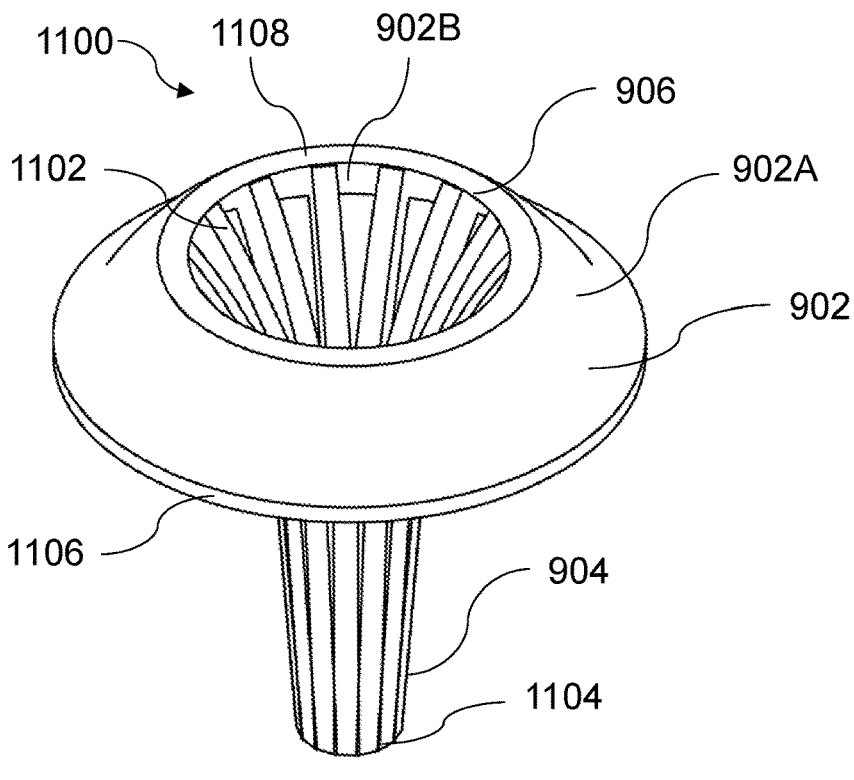
FIGS. 11A and 11C show another example reusable growing plug, in a first configuration.
Figure 11B:
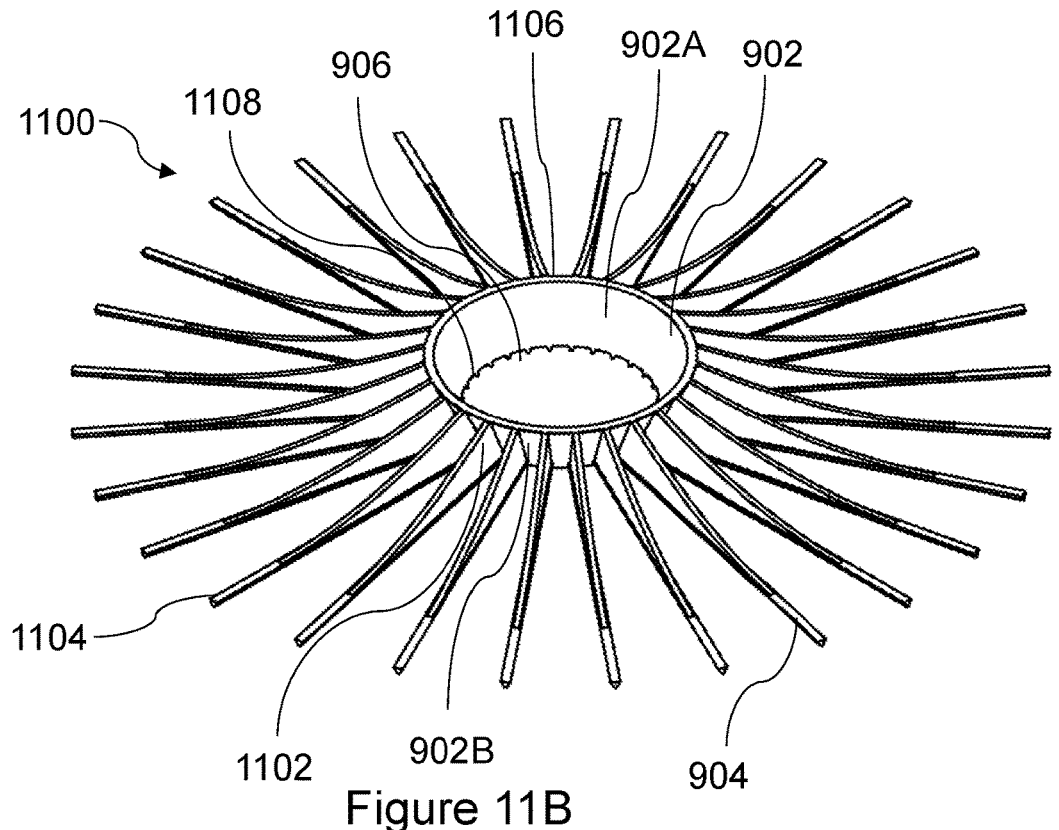
FIGS. 11B and 11D show the example reusable growing plug of FIGS. 11A and 110, in a second configuration.
Figure 11C:
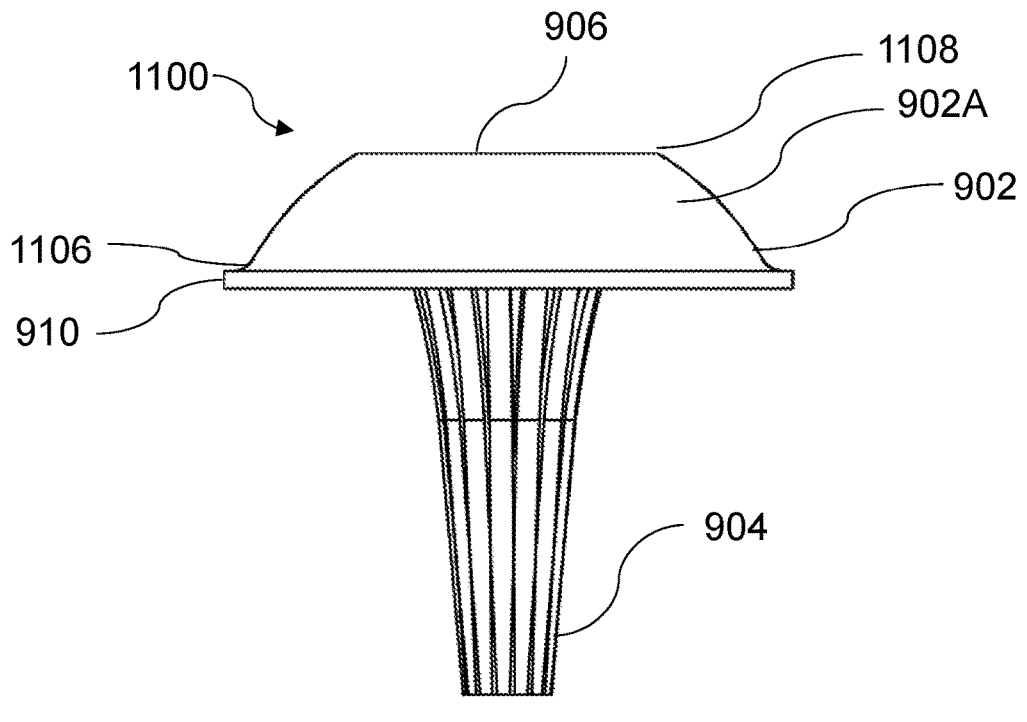

FIGS. 11A and 11C show the example growing plug 1100 arranged in a first configuration, wherein the diaphragm 902 is biased to form a tapered shape, in this example akin to a frustum of a cone, wherein the outer edge 1106 of the diaphragm provides the base of the frustum. The plurality of prongs 904 are brought together in the first configuration relative to the second configuration.

Figure 11D:
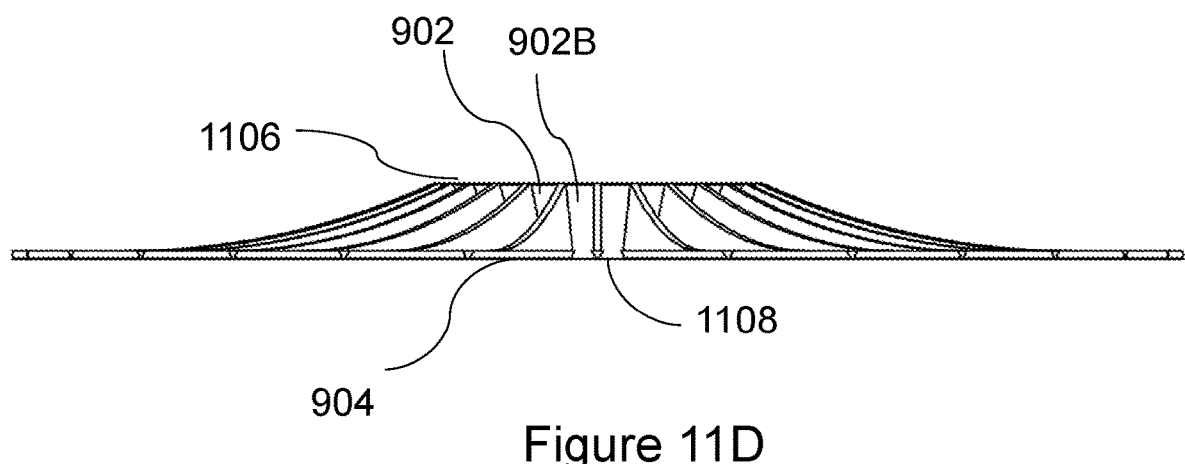

FIGS. 11B and 11D show the example growing plug 1100 arranged in a second configuration, wherein the diaphragm 902 is biased to form an inverse tapered shape, opposite to the frustum of a cone shape of the first configuration. This may be achieved by changing the position of the outer edge 1106 of the diaphragm 902 relative to the position of the inner edge 1108 of the diaphragm 902. For example, in the first configuration, the outer edge 1106 of the diaphragm 902 may be vertically displaced from the inner edge 1108 such that the first surface 902A is outwards facing, for example wherein the outer edge 1106 is arranged below the inner edge 1108 as shown in FIGS. 11A and C. To transition the growing plug 1100 into the second configuration, the position of the outer edge 1106 of the diaphragm 902 relative to the position of the inner edge 1108 may be inverted such that the second surface 902B is outwards facing in the second configuration, for example wherein the outer edge 1106 is arranged above the inner edge 1108 as shown in FIGS. 11B and D.

The plurality of prongs 904 are separated in the second configuration relative to the first configuration. In this example, the plurality of prongs 904 are separated into a radial arrangement, such that the prongs 904 extend radially around the aperture 906 in the second configuration. In the radial arrangement of the second configuration, the plurality of prongs 904 are configured to lie in the same plane as the diaphragm 902 and/or aperture 906, for example such that the growing plug 1100 is configured to lie flat in the second configuration.

At least a portion of the diaphragm 902 may be configured to be received by an aperture for receiving a growing crop in a hydroponic system, such as the hydroponic system of any of FIGS. 1 to 8C. In some examples, at least a portion of the diaphragm 902 may be configured to engage with the circumference of the aperture for receiving a growing crop in a hydroponic system by a friction fit. In some examples, the flange 910 may be configured to secure and/or seal the growing plug 1100 within a receiving aperture in a hydroponic system, for example by engaging with the edges of the aperture. For example, when a flange 910 is arranged at the upper edge of the resilient portion 908, the flange 910 may resist the growing plug falling through an aperture for receiving a growing crop and into the conduit in a hydroponic system. When a flange 910 is arranged at the lower edge of the resilient portion 908, the flange 910 may resist the growing plug falling out of an aperture for receiving a growing crop in a hydroponic system during rotation.

In use, the first configuration is configured to grasp a growing crop between the prongs 904. This may secure the growing crop in position within the growing plug 1100.

As the growing crop grows, the root system extends along the prongs 904. When in situ within a hydroponic system, this allows the roots to extend into the nutrient and fluid supply, for example within a conduit.

Before the root system has developed, the growing crop may receive fluid from the prongs 904 which retain some of the passing fluid through surface tension. During rotation, the retained fluid may travel along the prongs 904 to the growing crop.

The shoot system of the growing crop grows in the opposite direction to the root system, and as it grows the stem protrudes through the aperture 906. This may be driven by the plant's sense of phototropism. During growth, the stem of the growing crop becomes thicker and the aperture 906 may be configured to flex to widen to accommodate the thickening of the stem.

After a period of growth, the shoot system of the growing crop may be easily harvested as it protrudes through the aperture 906 and outwards from the first surface 902A of the growing plug 1100.

In use, the second configuration is configured to separate and/or break the roots of a growing crop. This may facilitate easy removal of the growing crop roots from the growing plug 1100 after the growing crop has been harvested. The reusable growing crop 1100 may then be easily cleaned for reuse with another growing crop.

FIG. 10 describes a method 1000 for using reusable growing plugs, for example the reusable growing plug of the second aspect of the present invention, for example any of growing plugs 900 or 1100, within a hydroponic system, for example the hydroponic system of the first aspect of the present invention. Firstly, a seed/growing crop is placed between the plurality of prongs of a growing plug in the second configuration (1010). The growing plug is then biased into the first configuration which causes the plurality of prongs to be brought together, grasping the seed/growing crop between the prongs to secure the seed/growing crop (1020). The growing plug may then be placed into an aperture for receiving a growing crop in a hydroponic growing frame (1030). These steps may be repeated for a plurality of growing plugs (1040), optionally until all the plurality of apertures for receiving a growing crop within the hydroponic system receive a growing plug.

The hydroponic system is then operated for a period of growth (1050). Operation involves rotating the rotating portion of the hydroponic growing frame. This may feed nutrient-rich fluid through the spiral conduit of growing frame, past the plurality of growing plugs grasping the seeds/growing crop. As the seed/growing crop grows, the plant will protrude through the aperture in the growing plug.

After the period of growth, the growing crop may be harvested (1060). Harvesting can be undertaken whilst the crop is still within the growing plug and hydroponic growing frame. The rotating portion of the hydroponic growing frame may be optionally rotated to facilitate harvesting by bringing the growing crop to easily reachable height.

The growing plugs are then biased into the second configuration to break the roots of the remaining plant matter after harvest (1070). This facilitates cleaning and removal of plant matter.

The hydroponic system is then operated for a period of cleaning (1080). Operation involves rotating the rotating portion of the hydroponic growing frame. This may feed fluid through the spiral conduit of growing system, past the plurality of growing plugs, washing away residual plant matter and debris. Optionally, air may also be blown through the spiral conduit during cleaning to clear residual dried roots and debris.

The growing plugs may then be removed from the hydroponic growing frame (1090). In some examples, the growing plugs may be subject to further cleaning steps, including rinsing.

The method 1000 can then be repeated for a different crop cycle.

In other examples, the plurality of growing plugs are not removed from the hydroponic growing frame between crop cycles. In these examples, the growing plug is biased into the first configuration within the hydroponic growing frame and the seed/growing crop may be pushed through the aperture of the growing plug during planting to be secured between the plurality of prongs of the growing plug. Steps 1050 to 1080 of the method may then continue as described above, wherein the hydroponic system is operated by rotating, either manually or using a motor, for a period of growth (1050), before the growing crop is harvested from the growing plugs within the hydroponic growing frame (1060). The plurality of growing plugs are then biased into the second configuration to break the roots of the harvested growing crop and facilitate cleaning (1070). The hydroponic system may then be operated by rotating for a period of cleaning (1080). After cleaning, the growing plugs are again biased into the first configuration within the hydroponic growing frame. The growing plugs may be transitioned between the first and second configurations whilst remaining within the hydroponic growing frame. The method may then be repeated for different crop cycles.

In the context of the present disclosure other examples and variations of the apparatus and methods described herein will be apparent to a person of skill in the art.

The invention claimed is:

1. A reusable growing plug, for use in hydroponic systems, wherein at least a portion of the growing plug is flexible, and comprises:

a first surface;

a second surface;

at least one aperture for receiving a growing crop, the aperture extending through the first surface and the second surface; and a plurality of prongs, coupled to the second surface;

wherein the growing plug has a first configuration and a second configuration, wherein in the first configuration the plurality of prongs are brought together relative to the second configuration, for grasping the growing crop; and wherein in the second configuration the plurality of prongs are separated relative to the first configuration, for separating the roots of the growing crop.

2. The reusable growing plug of claim 1, wherein in the first configuration the growing plug is biased to form a dome, and wherein in the second configuration the growing plug is biased to form an inverse dome, opposite to the first configuration.

3. The reusable growing plug of claim 1, wherein the aperture for receiving a growing crop is cross-shaped.

4. The reusable growing plug of claim 1, wherein the plurality of prongs coupled to the second surface comprises at least four flexible prongs.

5. The reusable growing plug of claim 1, wherein the growing plug is made of rubber.

6. The reusable growing plug of claim 1, further comprising a grip on the first surface for facilitating transitioning between the first and second configurations.

7. The reusable growing plug of claim 1, further comprising a resilient portion, wherein the resilient portion comprises a flange configured to engage with the edges of an aperture for receiving a growing crop in a hydroponic system.

8. A hydroponic system for irrigating a growing crop, the system comprising:

a growing frame, the growing frame comprising a rotating portion;

wherein the rotating portion comprises a plurality of the reusable growing plugs of claim 1, wherein each of the plurality of reusable growing plugs are configured to fit within a plurality of apertures for receiving the growing crop on the rotating portion.

9. A hydroponic system for irrigating a growing crop, the system comprising:

a growing frame, the growing frame comprising a rotating portion;

wherein the rotating portion comprises: a spiral conduit for receiving nutrient-rich fluid, the spiral conduit comprising a plurality of apertures for receiving the growing crop; and wherein the spiral conduit comprises an opening for receiving the nutrient-rich fluid into the spiral, such that in use rotation of the spiral conduit feeds the nutrient-rich fluid around the spiral conduit towards the centre of the spiral conduit and past the plurality of apertures for receiving the growing crop, providing a plurality of reusable growing plugs of claim 1, wherein each of the plurality of reusable growing plugs are configured to fit within the plurality of apertures for receiving the growing cup on the spiral conduit.

10. The hydroponic system of claim 9 wherein the opening for receiving the nutrient-rich fluid comprises a scoop.

11. The hydroponic system of claim 9 wherein the plurality of apertures for receiving the growing crop are arranged on a face of the conduit facing towards the centre of the spiral conduit.

12. The hydroponic system of claim 9 wherein the plurality of apertures for receiving the growing crop are evenly spaced around the spiral.

13. The hydroponic system of claim 9 wherein the growing frame further comprises a static portion to support the rotating portion.

14. The hydroponic system of claim 13 wherein the spiral conduit is supported by the static portion of the growing frame above a fluid bath, wherein the opening for receiving the nutrient-rich fluid into the spiral conduit is configured to scoop up fluid as the spiral conduit is rotated, and wherein the centre of the spiral is coupled to a flow path for feeding fluid back to the fluid bath.

15. The hydroponic system of claim 9 wherein the spiral is an Archimedean spiral.

16. The hydroponic system of claim 15, wherein the growing frame comprises a pair of conduits arranged as a pair of spirals, wherein the first spiral conduit is offset by 180 degrees from the second spiral conduit in the rotation axis such that the opening for receiving the nutrient-rich fluid is on the opposite side of the first spiral conduit to the opening for receiving the nutrient-rich fluid of the second spiral conduit.

17. The hydroponic system of claim 9 wherein the growing frame comprises a plurality of conduits arranged in a plurality of spirals.

18. The hydroponic system of claim 9 further comprising a strip light source, wherein either (i) the strip light source is held adjacent to the spiral conduit, wherein the length of the strip light source is based on the diameter of the spiral; or (ii) the strip light source is arranged on at least a portion of a face of the conduit facing away from the centre of the spiral.

19. The hydroponic system of claim 9 comprising a set of tracks, wherein the set of tracks supports a plurality of growing frames of any of the previous claims, and wherein the plurality of growing frames of any of the previous claims are movable on the set of tracks to adjust their separation.

* * * * *